(12) United States Patent
Liu et al.

(10) Patent No.: US 11,366,151 B2
(45) Date of Patent: Jun. 21, 2022

(54) METHOD AND DEVICE FOR EVALUATING ELECTRICAL PERFORMANCE OF RADOME

(71) Applicant: KUANG-CHI INSTITUTE OF ADVANCED TECHNOLOGY, Shenzhen (CN)

(72) Inventors: Ruopeng Liu, Shenzhen (CN); Hua Tian, Shenzhen (CN); Yang He, Shenzhen (CN); Xiaoyu Zhang, Shenzhen (CN); Qingwen Feng, Guangdong (CN)

(73) Assignee: Kuang-Chi Institute of Advanced Technology, Shenzhen (CN)

( * ) Notice: Subject to any disclaimer, the term of this patent is extended or adjusted under 35 U.S.C. 154(b) by 342 days.

(21) Appl. No.: 16/474,324

(22) PCT Filed: Dec. 21, 2017

(86) PCT No.: PCT/CN2017/117662
§ 371 (c)(1),
(2) Date: Jun. 27, 2019

(87) PCT Pub. No.: WO2018/121395
PCT Pub. Date: Jul. 5, 2018

(65) Prior Publication Data
US 2019/0339318 A1 Nov. 7, 2019

(30) Foreign Application Priority Data

Dec. 30, 2016 (CN) .......................... 201611260531.X
Dec. 30, 2016 (CN) .......................... 201611262474.9

(51) Int. Cl.
*G01R 29/10* (2006.01)
*G06F 30/20* (2020.01)
(Continued)

(52) U.S. Cl.
CPC .............. *G01R 29/10* (2013.01); *G01R 29/08* (2013.01); *G06F 30/20* (2020.01); *H01Q 1/422* (2013.01)

(58) Field of Classification Search
CPC ......... G06F 30/20; G01R 29/08; G01R 29/10; H01Q 13/06
See application file for complete search history.

(56) References Cited

U.S. PATENT DOCUMENTS 4,468,669 A * 8/1984 Wang ...................... G01R 29/10
343/703
8,081,138 B2 * 12/2011 Wu ..................... H01Q 15/0086
343/873
(Continued)

FOREIGN PATENT DOCUMENTS

CN 102590656 A 7/2012
CN 102799782 A 11/2012
(Continued)

OTHER PUBLICATIONS

Zhang, Hengqing, "The Electric Property Assessment of Supersonic Missile Radome", Guidance & Fuze, 26(1), Mar. 31, 2005 (Mar. 31, 2005), ISSN: 1671-0576, pp. 41-42.
(Continued)

*Primary Examiner* — Thai Q Phan
(74) *Attorney, Agent, or Firm* — Armstrong Teasdale LLP

(57) ABSTRACT

Method and device for evaluating the electrical performance of an antenna cover. The method for evaluating the electrical performance of the antenna cover comprises: acquiring electromagnetic parameter information of an antenna and parameter information of an antenna cover; calculating far-field information of the antenna and far-field information of an antenna system on the basis of the electromagnetic parameter information of the antenna and of the parameter information of the antenna cover; and calculating electrical (Continued)

performance parameter information of the antenna cover on the basis of the far-field information of the antenna and of the far-field information of the antenna system. By means of the actual measurement of the electromagnetic parameter information of the antenna and of the parameter information of the antenna cover, the calculation of the far-field information of the antenna and of the far-field information of the antenna system, and the electrical performance parameter information of the antenna cover thus produced, without relying on a precise digital model of the antenna or when the antenna system is of increased complexity, calculation precision is ensured, the operability of the evaluation of the electrical performance of the antenna cover is greatly increased, and calculation precision is effectively increased.

11 Claims, 8 Drawing Sheets

(51) Int. Cl.
*G01R 29/08* (2006.01)
*H01Q 1/42* (2006.01)

(56) References Cited

U.S. PATENT DOCUMENTS

| | | | |
|---|---|---|---|
| 9,425,515 B2* | 8/2016 | Honda | H01Q 21/0062 |
| 10,746,774 B2* | 8/2020 | Varadan | G01R 29/10 |
| 2009/0284426 A1 | 11/2009 | Snow et al. | |
| 2010/0097281 A1* | 4/2010 | Wu | H01Q 1/38 |
| | | | 343/767 |
| 2013/0262042 A1 | 10/2013 | Grellou et al. | |
| 2018/0115058 A1* | 4/2018 | Henry | H01Q 13/06 |
| 2019/0173565 A1* | 6/2019 | Kim | H04B 7/04 |
| 2019/0305433 A1* | 10/2019 | Bennett | H01Q 5/55 |
| 2019/0379125 A1* | 12/2019 | Varadan | G01R 29/10 |
| 2019/0393949 A1* | 12/2019 | Kim | H04B 7/15 |
| 2020/0144728 A1* | 5/2020 | Bennett | H01Q 1/50 |
| 2020/0333389 A1* | 10/2020 | Varadan | G01R 29/10 |

FOREIGN PATENT DOCUMENTS

| | | |
|---|---|---|
| CN | 103401070 A | 11/2013 |
| CN | 104484537 A | 4/2015 |
| CN | 104573216 A | 4/2015 |
| CN | 104750960 A | 7/2015 |
| CN | 105486948 A | 4/2016 |
| CN | 106252873 A | 12/2016 |

OTHER PUBLICATIONS

International Search Report for International Application No. PCT/CN2017/117662, dated Mar. 21, 2018, 2 pages.

Demetrius T Paris: "Computer-aided radome analysis," Jan. 1, 1970, retrieved from Internet: URL: https://ieeexplore.ieee.org/document/1139614, Abstract provided.

Sudhakar Rao et al.: "Electromagnetic Design and Performance Analysis of Airborne Radomes: Trends and Perspectives [Antenna Applications Corner]," IEEE Antennas and Propagation Magazine, IEEE Service Center, Piscathaway, NJ, US, vol. 56, No. 4, Aug. 1, 2014, pp. 276-298.

Xu Wanye et al.: "EM Analysis of Deformed Metal Space Frame Radome," IEEE Antennas and Wireless Propagation Letters, vol. 13, Jan. 9, 2014, pp. 130-133, Abstract provided.

Extended European Seach Report for corresponding European Patent App. No. 17885526.8, dated Feb. 11, 2021, 17 pages.

* cited by examiner

METHOD AND DEVICE FOR EVALUATING ELECTRICAL PERFORMANCE OF RADOME

CROSS-REFERENCE TO RELATED APPLICATIONS

This application is the national stage entry of PCT/CN2017/117662, filed on Dec. 21, 2017, which claims the benefit of priority to Chinese Patent Application No. 201611262474.9, filed Dec. 30, 2016, and Chinese Patent Application No. 201611260531.X, filed Dec. 30, 2016, which are incorporated by reference in their entirety herein.

TECHNICAL FIELD

The present invention relates to the antenna field, and specifically, to a method and a device for evaluating electrical performance of a radome.

BACKGROUND

In the prior art, a physical optics algorithm is generally used to calculate a near-zone field that is incident to an inner wall of a radome according to electric field distribution of the antenna aperture surface or a Fourier transform relationship between an antenna plane spectrum and the electric field distribution of the antenna aperture surface; and then, transmission and reflection fields on a partial plane are calculated in accordance with a ray principle of geometric optics.

However, this method for evaluating electrical performance has obvious defects. For example, the electric field information of the antenna aperture surface is generally obtained based on full-wave simulation on an antenna digital model. When there is no antenna digital model, simulation is generally performed by approximate modeling. Moreover, for an antenna system with a complex tooling structure, the model must be simplified before full-wave simulation. The above examples are different from the actual radiation characteristic of the antenna system.

Therefore, in the prior art, when a precise digital model of an antenna cannot be obtained or when an antenna system is relatively complex, it is generally impossible to achieve a high-precision evaluation of electrical performance of the radome.

In view of the problems in the related art, no effective solution has been proposed yet.

SUMMARY

According to one aspect of the present invention, a method for evaluating electrical performance of a radome is provided, the radome and an antenna disposed in the radome form an antenna system, and the method for evaluating electrical performance comprises:

obtaining electromagnetic parameter information of the antenna and parameter information of the radome;

calculating far-field information of the antenna and far-field information of the antenna system according to the electromagnetic parameter information of the antenna and the parameter information of the radome; and calculating electrical performance parameter information of the radome according to the far-field information of the antenna and the far-field information of the antenna system.

In one embodiment, the method for evaluating electrical performance specifically comprises:

obtaining near-field electric field information of the antenna according to the measurement, and calculating electric field information of antenna aperture surface according to the near-field electric field information;

obtaining model data information of the radome, and obtaining split facet information of the radome according to the model data information of the radome;

calculating the far-field information of the antenna and the far-field information of the antenna system based on the electric field information of the antenna aperture surface and the split facet information of the radome; and calculating the electrical performance parameter information of the radome based on the far-field information of the antenna and the far-field information of the antenna system.

In one embodiment, after the step of obtaining near-field electric field information of the antenna according to the measurement, and calculating electric field information of antenna aperture surface according to the near-field electric field information, the method further comprising:

performing near-field to far-field transformation on the electric field information of the antenna aperture surface, to obtain a calculated value of the far-field information corresponding to the electric field information of the antenna aperture surface; and comparing a measured value of the far-field information of the antenna aperture surface obtained according to the actual measurement and the calculated value of the far-field information of the antenna aperture surface, to verify the electric field information of the antenna aperture surface.

In one embodiment, the step of comparing a measured value of the far-field information of the antenna aperture surface obtained according to the actual measurement and the calculated value of the far-field information of the antenna aperture surface, to verify the electric field information of the antenna aperture surface comprises:

comparing the calculated value of the far-field information of the antenna aperture surface and the measured value of the far-field information of the antenna aperture surface; and determining the electric field information of the antenna aperture surface as the actual electric field information of the antenna aperture surface, if a difference between the calculated value of the far-field information and the measured value of the far-field information does not exceed a predetermined threshold; or adjusting a test parameter of the near-field electric field information of the antenna and returning to the step of obtaining near-field electric field information of the antenna according to the measurement and calculating electric field information of antenna aperture surface according to the near-field electric field information, if the difference exceeds the predetermined threshold.

In one embodiment, the step of obtaining split facet information of the radome according to the model data information of the radome comprises:

performing digital model preprocessing on the model data information of the radome, to obtain simplified model data information of the radome; the simplified model data information of the radome determining a center of the antenna aperture surface as an origin of a plane coordinate system, and the antenna aperture surface and the plane coordinate system being located on the same plane; and performing discrete splitting and extracting on the simplified model data information of the radome, to obtain the split facet information of the radome.

In one embodiment, the split facet information of the radome comprises a center point coordinate (x, y, z) of the split facet, a normal vector $\hat{n}_c$ of the split facet, and an area ds of the split facet; and the step of calculating the far-field information of the antenna based on the electric field information of the antenna aperture surface and the split facet information of the radome comprises:

calculating incident field information radiated by the antenna to the radome based on the electric field information of the antenna aperture surface and the split facet information of the radome, the incident field information of an inner surface of the radome comprising an electric field vector $E_{i1}$ and a magnetic field vector $H_{i1}$ of an incident field at a field point that is located on the $i^{th}$ split facet, and performing calculation operation according to the following formulas:

$$E_{i1} = -\frac{1}{4\pi} \int_s (E_a \times \hat{n}_a) \times \hat{\rho} \left(jk + \frac{1}{\rho}\right) \frac{e^{-jk\rho}}{\rho} ds; \text{ and}$$

$$H_{i1} = \frac{1}{j4\pi\omega\mu} \int_s \left[-(E_a \times \hat{n}_a)\frac{1}{\rho}\left(jk + \frac{1}{\rho}\right) + k^2(E_a \times \hat{n}_a)\right]\frac{e^{-jk\rho}}{\rho} ds' +$$

$$\frac{1}{j4\pi\omega\mu} \int_s [(E_a \times \hat{n}_a)\hat{\rho}]\hat{\rho}\left(-k^2 + \frac{3jk}{\rho} + \frac{3}{\rho^2}\right)\frac{e^{-jk\rho}}{\rho} ds';$$

wherein $\lambda_0$ represents a free-space wavelength, $k=2\pi/\lambda_0$ represents a free-space wavenumber; $\varepsilon$ represents the permittivity, $\mu$ represents the permeability; $\omega=2\pi f$ represents an angular frequency, $f$ represents an operating frequency of the antenna; $\rho=|r-r'|$ represents a distance from a source point to the field point on the radome, $$\hat{\rho} = \frac{r - r'}{|r - r'|}$$

represents a unit vector of $\rho$; r is a position vector of the field point on the radome, r' is a position vector of the source point on the antenna aperture; $\hat{n}_a$ is a unit normal vector of the antenna aperture, the electric field information of the antenna aperture surface comprises an electric field $E_a$ excited by the antenna aperture, and i is an integer greater than 1.

In one embodiment, the step of calculating the far-field information of the antenna based on the electric field information of the antenna aperture surface and the split facet information of the radome further comprises:

obtaining scattering parameter information of the radome;

calculating transmission field information of the radome based on the scattering parameter information of the radome and the incident field information radiated by the antenna to the radome, the transmission field information comprising an electric field vector $E_{o1}$ and a magnetic field vector $H_{o1}$ of a primary transmission field, an electric field vector $E_{o2}$ and a magnetic field vector $H_{o2}$ of a secondary transmission field; and calculating the far-field information $E^t(\theta,\phi)$ of the antenna system, based on the transmission field information of the radome and the split facet information of the radome, by using the following formulas:

$$E_i^t(\theta, \phi) = \frac{-jk}{4\pi}\frac{e^{-jkr}}{r}\hat{r} \times \int_s \left[(\hat{n} \times E_{o1}(r)) - \sqrt{\frac{\mu}{\varepsilon}}\hat{r} \times (\hat{n} \times H_{o1}(r))\right]e^{-jkr'} ds;$$

$$E_r^t(\theta, \phi) = \frac{-jk}{4\pi}\frac{e^{-jkr}}{r}\hat{r} \times \int_s \left[(\hat{n} \times E_{o2}(r)) - \sqrt{\frac{\mu}{\varepsilon}}\hat{r} \times (\hat{n} \times H_{o2}(r))\right]e^{-jkr'} ds;$$

and $$E^t(\theta, \phi) = E_i^t(\theta, \phi) + E_r^t(\theta, \phi).$$

In one embodiment, the step of calculating transmission field information of the radome according to the scattering parameter information of the radome and the incident field information radiated by the antenna to the radome comprises:

performing; based on an incident surface $\hat{n}_c \times \hat{k}_{i1}$ defined by the normal vector $\hat{n}_c$ of the split facet and a propagating direction vector $\hat{k}_{i1}$ of an incident wave, and a unit vector $\hat{e}_{i1}$ of the incident electric field in a polarization direction; polarizational decomposition on a horizontal direction vector $\hat{e}_\top$ and a vertical direction vector $\hat{e}_\perp$ of an incident electromagnetic field along the incident surface, and calculating a vertical polarization wave component $E_{i1}^\perp$ and a horizontal polarization wave component $\mathbf{E}_{i1}^\|$ respectively by using the following formulas:

$$E_{i1}^\perp = (E_{i1} \cdot \hat{e}_\perp)\hat{e}_\perp, \quad \mathbf{E}_{i1}^\| = (E_{i1} \cdot \hat{e}_\|)\hat{e}_\|;$$

$$H_{i1}^\perp = (H_{i1} \cdot \hat{e}_\perp)\hat{e}_\perp, \quad \mathbf{H}_{i1}^\| = (H_{i1} \cdot \hat{e}_\|)\hat{e}_\|;$$

$$\hat{e}_\perp = \hat{e}_{i1} \cdot (\hat{n}_c \times \hat{k}_{i1}), \text{ and } \hat{e}_\| = \hat{e}_\perp \times \hat{k}_{i1};$$

the scattering parameter information comprising an amplitude $S11^\perp$ and a phase $\phi_{11}^\perp$ of a vertical polarization wave reflecting coefficient S11, an amplitude $S11^\|$ and a phase $\phi_{11}^\|$ of a horizontal polarization wave reflecting coefficient S11'; an amplitude $S21^\perp$ and a phase $\phi_{21}^\perp$ of a vertical polarization wave transmitting coefficient S21, an amplitude $S21^\|$ and a phase $\phi_{21}^\|$ of a horizontal polarization wave transmitting coefficient S21';

calculating a vertical component $E_{o1}^\perp$ and a horizontal component $H_{o1}^\perp$ of the electric field vector of the primary transmission field, a vertical component $H_{o1}^\perp$ and a horizontal component $H_{o1}^\|$ of the magnetic field vector of the primary transmission field, based on propagation characteristics of a plane electromagnetic field and the scattering parameter information, by using the following formulas:

$$\begin{cases} E_{o1}^\perp = E_{i1}^\perp S21^\perp e^{j\left(\phi_{21}^\perp \frac{2\pi d}{\lambda}\cos\theta_{i1}\right)}, E_{o1}^\| = E_{i1}^\| S21^\| e^{j\left(\phi_{21}^\| \frac{2\pi d}{\lambda}\cos\theta_{i1}\right)} \\ H_{o1}^\perp = H_{i1}^\perp S21^\| e^{j\left(\phi_{21}^\| \frac{2\pi d}{\lambda}\cos\theta_{i1}\right)}, H_{o1}^\| = H_{i1}^\| S21^\| e^{j\left(\phi_{21}^\| \frac{2\pi d}{\lambda}\cos\theta_{i1}\right)} \end{cases};$$

the incident field information comprising an incident angle $\theta_{i1}$;

obtaining the electric field vector $E_{o1}$ of the primary transmission field based on the vertical component $E_{o1}^\perp$ and the horizontal component $E_{o1}^\|$ of the electric field vector of the primary transmission field, and obtaining the magnetic field vector $H_{o1}$ of the primary transmission field based on the vertical component $H_{o1}^\perp$ and the horizontal component of $H_{o1}^\|$ of the magnetic field vector of the primary transmission field;

calculating an electric field vector $E^r$ and a magnetic field vector $H^r$ of the primary reflection field by using the following formulas:

$$\begin{cases} E^r = E_{i1}^\perp S11^\perp e^{j\phi_{11}^\perp} + (E_{o1}^\| \times \hat{k}_r) S11^\| e^{j\phi_{11}^\|} \\ H^r = H_{i1}^\| S11^\| e^{j\phi_{11}^\|} + (H_{i1}^\| \times \hat{k}_r) S11^\perp e^{j\phi_{11}^\perp} \end{cases}, \quad \hat{k}_r = \hat{k}_{i1} - 2(\hat{n}_c \cdot \hat{k}_{i1})\hat{n}_c;$$

$\hat{k}_r$ representing a reflection direction vector of an incident wave; and calculating an electric field vector $E_{i2}$ and a magnetic field vector $H_{i2}$ of a secondary incident field by using the following formulas:

$$E_{i2} =$$

$$\frac{1}{j4\pi\omega\varepsilon}\int_s\left[-(\hat{n}\times H^r)\frac{1}{\rho}\left(jk+\frac{1}{\rho}\right)+[(\hat{n}\times H^r)\Box\hat{\rho}]\hat{\rho}\left(-k^2+\frac{3jk}{\rho}+\frac{3}{\rho^2}\right)+k^2\right.$$

$$\left.(\hat{n}\times H^r)\right]\frac{e^{-jk\rho}}{\rho}ds' - \frac{1}{4\pi}\int_s(E^r\times\hat{n})\times\hat{\rho}\left(jk+\frac{1}{\rho}\right)\frac{e^{-jk\rho}}{\rho}ds'$$

and $$H_{i2} =$$

$$\frac{1}{j4\pi\omega\mu}\int_s\left[-(E^r\times\hat{n})\frac{1}{\rho}\left(jk+\frac{1}{\rho}\right)+[(E^r\times\hat{n})\Box\hat{\rho}]\hat{\rho}\left(-k^2+\frac{3jk}{\rho}+\frac{3}{\rho^2}\right)+\right.$$

$$\left.k^2(E^r\times\hat{n})\right]\frac{e^{-jk\rho}}{\rho}ds' + \frac{1}{4\pi}\int_s(\hat{n}\times H^r)\times\hat{\rho}\left(jk+\frac{1}{\rho}\right)\frac{e^{-jk\rho}}{\rho}ds'$$

In one embodiment, the step of obtaining scattering parameter information of the radome comprises:

performing full-wave simulation on the radome to obtain the scattering parameter information of the radome.

In one embodiment, the electrical performance parameter information comprises at least one of the following:

power transmission efficiency, a sidelobe elevation parameter, a sidelobe elevation parameter of a far-zone RMS, 3 dB beamwidth, and consistency of amplitude and phase.

In one embodiment, the method for evaluating electrical performance specifically comprises:

obtaining parameter information of an electric field and a magnetic field on the antenna aperture surface or electric and magnetic current density vectors of the antenna surface, and obtaining scattering parameter information of the radome;

obtaining parameter information of a split facet of the radome;

calculating the far-field information of the antenna and the far-field information of the antenna system respectively based on the parameter information of the electric field and the magnetic field on the antenna aperture surface or the electric and magnetic current density vectors of the antenna surface, the scattering parameter information of the radome, and the parameter information of the split facet of the radome; and calculating the electrical performance parameter information of the radome based on the far-field information of the antenna and the far-field information of the antenna system.

In one embodiment, the step of obtaining scattering parameter information of the radome comprises:

generating a radome simulation model based on the radome, each of the radome and the radome simulation model comprising a plurality of microstructure stacks that have the same structure and are arranged in the same manner; and performing full-wave simulation on the radome simulation model to obtain the scattering parameter information of the radome.

In one embodiment, the step of obtaining parameter information of an electric field and a magnetic field on the antenna aperture surface or electric and magnetic current density vectors of the antenna surface, and obtaining scattering parameter information of the radome comprises:

obtaining model data information of the antenna and model data information of the radome;

performing digital model preprocessing on the model data information of the antenna and the model data information of the radome, to obtain preprocessed data information of the antenna and preprocessed data information of the radome; the preprocessed data information of the antenna and the preprocessed data information of the radome determining a center of the antenna aperture surface as an origin of a coordinate system, and the antenna aperture surface and the coordinate system being located on the same plane;

obtaining the parameter information of the electric field and the magnetic field on the antenna aperture surface or the electric and magnetic current density vectors of the antenna surface based on the preprocessed data information of the antenna; and obtaining the scattering parameter information of the radome based on the preprocessed data information of the radome.

In one embodiment, the parameter information of the split facet of the radome comprises a center point coordinate (x, y, z) of the split facet, a normal vector $\hat{n}_c$ of the split facet, and an area ds of the split facet; and the step of calculating the far-field information of the antenna based on the electric and magnetic current density vectors of the antenna surface, the scattering parameter information of the radome, and the parameter information of the split facet of the radome comprises:

calculating incident field information of an inner surface of the radome based on the electric current density vector J and the magnetic current density vector M of the antenna surface and the parameter information of the split facet of the radome, the incident field information of the inner surface of the radome comprising an electric field vector $E_{i1}$ and a magnetic field vector $H_{i1}$ of the incident field at a field point that is located on the $i^{th}$ split facet of the radome, and performing calculation operation according to the following formulas:

$$E_{i1} =$$

$$\frac{1}{j4\pi\omega\varepsilon}\int_s\left[-J\frac{1}{\rho}\left(jk+\frac{1}{\rho}\right)+(J\Box\hat{\rho})\hat{\rho}\left(-k^2+\frac{3jk}{\rho}+\frac{3}{\rho^2}\right)+k^2J\right]\frac{e^{-jk\rho}}{\rho}ds -$$

$$\frac{1}{4\pi}\int_s M\times\hat{\rho}\left(jk+\frac{1}{\rho}\right)\frac{e^{-jk\rho}}{\rho}ds, \text{ and}$$

$$H_{i1} = \frac{1}{j4\pi\omega\mu}\int_s\left[-M\frac{1}{\rho}\left(jk+\frac{1}{\rho}\right)+(M\Box\hat{\rho})\hat{\rho}\left(-k^2+\frac{3jk}{\rho}+\frac{3}{\rho^2}\right)+k^2M\right]$$

$$\frac{e^{-jk\rho}}{\rho}ds + \frac{1}{4\pi}\int_s J\times\hat{\rho}\left(jk+\frac{1}{\rho}\right)\frac{e^{-jk\rho}}{\rho}ds;$$

$$k = 2\pi/\lambda_0, \omega = 2\pi f, \hat{\rho} = \frac{r-\hat{r}}{|r-\hat{r}|}, \rho = |r-\hat{r}|;$$

and wherein $\lambda_0$ represents a free-space wavelength, k represents a free-space wavenumber; $\varepsilon$ represents the permittivity, $\mu$ represents the permeability; $\omega$ represents an angular frequency, $f$ represents an operating frequency of the antenna, $\rho$ represents a distance from a source point to the field point on the radome, $$\hat{\rho} = \frac{r-r'}{|r-r'|}$$

represents a unit vector of $\rho$; r is a position vector of the field point on the randome, r' is a position vector of the source point on the antenna aperture; and i is an integer greater than 1.

In one embodiment, the step of calculating the far-field information of the antenna based on the electric and magnetic current density vectors of the antenna surface, the scattering parameter information of the radome, and the parameter information of the split facet of the radome further comprises:

calculating transmission field information of the radome based on the scattering parameter information of the radome, the electric field vector $E_{i1}$ and the magnetic field vector $H_{i1}$ of the incident field; the transmission field information of the radome comprising an electric field vector $E_{o1}$ and a magnetic field vector $H_{o1}$ of a primary transmission field, an electric field vector $E_{o2}$ and a magnetic field vector $H_{o2}$ of a secondary transmission field; and calculating the far-field information $E^t$ of the antenna system, based on the transmission field information of the radome and the parameter information of the split facet of the radome, by using the following formulas:

$$E_i^t = \frac{-jk}{4\pi} \frac{e^{-jk\rho}}{\rho} \hat{r} \times \int_s \left[ (\hat{n} \times E_{o1}) - \sqrt{\frac{\mu}{\varepsilon}} \hat{r} \times (\hat{n} \times H_{o1}) \right] e^{-jkr'} ds;$$

$$E_r^t = \frac{-jk}{4\pi} \frac{e^{-jk\rho}}{\rho} \hat{r} \times \int_s \left[ (\hat{n} \times E_{o2}) - \sqrt{\frac{\mu}{\varepsilon}} \hat{r} \times (\hat{n} \times H_{o2}) \right] e^{-jkr'} ds; \text{ and}$$

$$E^t = E_i^t + E_r^t;$$

wherein $E_i^t$ represents a far-field electric field vector of the primary transmission field, and $E_r^t$ represents a far-field electric field vector of the secondary transmission field.

In one embodiment, the step of calculating transmission field information of the radome based on the scattering parameter information of the radome, the electric field vector $E_{i1}$ and the magnetic field vector $H_{i1}$ of the incident field comprises:

performing, based on an incident surface $\hat{n}_c \times \hat{k}_{i1}$ defined by the normal vector $\hat{n}_c$ the split facet and a propagating direction vector $\hat{k}_{i1}$ of an incident wave and a unit vector $\hat{e}_{i1}$ of the incident electric field in a polarization direction; polarizational decomposition on a horizontal direction vector $\hat{e}_{\square}$ and a vertical direction vector $\hat{e}_\perp$ of an incident electromagnetic field along the incident surface, and calculating a vertical polarization wave component $E_{i1}^\perp$ and a horizontal polarization wave component $\mathbf{E}_{i1}^\square$ respectively by using the following formulas:

$$E_{i1}^\perp = (E_{i1} \cdot \hat{\mathbf{e}}_\perp) \hat{e}_\perp, \quad \mathbf{E}_{i1}^\square = (E_{i1} \cdot \hat{\mathbf{e}}_\square) \hat{\mathbf{e}}_\square;$$

$$H_{i1}^\perp = (H_{i1} \cdot \hat{\mathbf{e}}_\perp) \hat{e}_\perp, \quad \mathbf{H}_{i1}^\square = (H_{i1} \cdot \hat{\mathbf{e}}_\square) \hat{\mathbf{e}}_\square;$$

$$\hat{e}_\perp = \hat{\mathbf{e}}_{i1} (\hat{n}_c \times \hat{k}_{i1}), \text{ and } \hat{\mathbf{e}}_\square = \hat{e}_\perp \times \hat{k}_{i1}; \text{ and}$$

the scattering parameter information comprising an amplitude $S11^\perp$ and a phase $\phi_{11}^\perp$ of a vertical polarization wave reflecting coefficient $S11$, an amplitude $S11^\square$ and a phase $\phi_{11}^\square$ of a horizontal polarization wave reflecting coefficient $S11'$; an amplitude $S21^\perp$ and a phase $\phi_{21}^\perp$ of a vertical polarization wave transmitting coefficient $S21$, an amplitude $S21^\square$ and a phase $\phi_{21}^\square$ of a horizontal polarization wave transmitting coefficient $S21'$;

calculating a vertical component $E_{o1}^\perp$ and a horizontal component $E_{o1}^{//}$ of the electric field vector of the primary transmission field, a vertical component $H_{o1}^\perp$ and a horizontal component $H_{o1}^{//}$ of the magnetic field vector of the primary transmission field, based on propagation characteristics of a plane electromagnetic field and the scattering parameter information, by using the following formulas:

$$\begin{cases} E_{o1}^\perp = E_{i1}^\perp S21^\perp e^{j\left(\phi_{21}^\perp - \frac{2\pi d}{\lambda} \cos\theta_{i1}\right)}, & E_{o1}^\square = E_{i1}^\square S21^\square e^{j\left(\phi_{21}^\square - \frac{2\pi d}{\lambda} \cos\theta_{i1}\right)} \\ H_{o1}^\perp = H_{i1}^\perp S21^\square e^{j\left(\phi_{21}^\square - \frac{2\pi d}{\lambda} \cos\theta_{i1}\right)}, & H_{o1}^\square = H_{i1}^\square S21^\perp e^{j\left(\phi_{21}^\perp - \frac{2\pi d}{\lambda} \cos\theta_{i1}\right)} \end{cases};$$

the incident field information comprising an incident angle $\theta_{i1}$;

obtaining the electric field vector $E_{o1}$ of the primary transmission field based on the vertical component $E_{o1}^\perp$ and the horizontal component $E_{o1}^{//}$ of the electric field vector of the primary transmission field, and obtaining the magnetic field vector $H_{o1}$ of the primary transmission field based on the vertical component $H_{o1}^\perp$ and the horizontal component $H_{o1}^{//}$ of the magnetic field vector of the primary transmission field;

calculating an electric field vector $E^r$ and a magnetic field vector $H^r$ of the primary reflection field by using the following formulas:

$$\begin{cases} E^r = E_{i1}^\perp S11^\perp e^{j\phi_{11}^\perp} + (E_{o1}^\square \times \hat{k}_r) S11^\square e^{j\phi_{11}^\square} \\ H^r = H_{i1}^\square S11^\square e^{j\phi_{11}^\square} + (H_{o1}^\square \times \hat{k}_r) S11^\perp e^{j\phi_{11}^\perp}, \quad \hat{k}_r = \hat{k}_{i1} - 2(\hat{n}_c \cdot \hat{k}_{i1})\hat{n}_c; \end{cases}$$

$\hat{k}_r$ representing a reflection direction vector of an incident wave; and calculating an electric field vector $E_{i2}$ and a magnetic field vector $H_{i2}$ of a secondary incident field by using the following formulas:

$$E_{i2} = \frac{1}{j4\pi\omega\varepsilon} \int_s \left[ -(\hat{n} \times H^r) \frac{1}{\rho}\left(jk + \frac{1}{\rho}\right) + [(\hat{n} \times H^r) \cdot \hat{\rho}] \hat{\rho}\left(-k^2 + \frac{3jk}{\rho} + \frac{3}{\rho^2}\right) + \right.$$
$$\left. k^2(\hat{n} \times H^r) \right] \frac{e^{-jk\rho}}{\rho} ds' - \frac{1}{4\pi} \int_s (E^r \times \hat{n}) \times \hat{\rho}\left(jk + \frac{1}{\rho}\right) \frac{e^{-jk\rho}}{\rho} ds'$$

and $$H_{i2} = \frac{1}{j4\pi\omega\mu} \int_s \left[ -(E^r \times \hat{n}) \frac{1}{\rho}\left(jk + \frac{1}{\rho}\right) + [(E^r \times \hat{n}) \cdot \hat{\rho}] \hat{\rho}\left(-k^2 + \frac{3jk}{\rho} + \frac{3}{\rho^2}\right) + \right.$$
$$\left. k^2(E^r \times \hat{n}) \right] \frac{e^{-jk\rho}}{\rho} ds' + \frac{1}{4\pi} \int_s (\hat{n} \times H^r) \times \hat{\rho}\left(jk + \frac{1}{\rho}\right) \frac{e^{-jk\rho}}{\rho} ds'$$

In one embodiment, the step of obtaining parameter information of the split facet of the radome comprises:

splitting preprocessed data information of the radome, and extracting the parameter information of the split facet of the radome from the preprocessed data information of the radome after splitting.

In one embodiment, the digital model preprocessing comprises a simplification processing, a translation processing, and a rotation processing.

According to another aspect of the present invention, a device for evaluating electrical performance of a radome is provided, wherein the radome and an antenna disposed in the radome form an antenna system, and the device for evaluating electrical performance comprises:

an obtaining module, configured to obtain electromagnetic parameter information of the antenna and parameter information of the radome;

a calculation module, configured to calculate far-field information of the antenna and far-field information of the antenna system according to the electromagnetic parameter information of the antenna and the parameter information of the radome; and an electrical performance parameter calculating module, configured to calculate electrical performance parameter information of the radome according to the far-field information of the antenna and the far-field information of the antenna system.

In one embodiment, the device for evaluating electrical performance specifically comprises:

an electric field information obtaining module, configured to obtain near-field electric field information of the antenna according to the measurement, and calculate electric field information of the antenna aperture surface according to the near-field electric field information;

a facet information obtaining module, configured to obtain model data information of the radome, and obtain the split facet information of the radome according to the model data information of the radome;

a far-field information calculating module, connected to the electric field information obtaining module and the facet information obtaining module, and configured to calculate the far-field information of the antenna and the far-field information of the antenna system according to the electric field information of the antenna aperture surface and the split facet information of the radome; and the electrical performance parameter calculating module, connected to the far-field information calculating module, and configured to calculate the electrical performance parameter information of the radome according to the far-field information of the antenna and the far-field information of the antenna system.

In one embodiment, the electric field information obtaining module comprises:

a conversion module, configured to perform near-field to far-field transformation on the electric field information of the antenna aperture surface, to obtain a calculated value of the far-field information corresponding to the electric field information of the antenna aperture surface; and a verification module, configured to compare a measured value of the far-field information obtained according to the actual measurement and the calculated value of the far-field information, to verify the electric field information of the antenna aperture surface.

In one embodiment, the verification module comprises:

a comparison submodule, configured to compare the calculated value of the far-field information of the antenna and the measured value of the far-field information; and a processing submodule;

wherein the processing submodule is configured to determine the electric field information of the antenna aperture surface as the actual electric field information of the antenna aperture surface, if a difference between the calculated value of the far-field information and the measured value of the far-field information does not exceed a predetermined threshold; or the processing submodule is configured to adjust a test parameter of the near-field electric field information of the antenna and the electric field information obtaining module is configured to obtain near-field electric field information of the antenna according to the measurement and calculate electric field information of the antenna aperture surface according to the near-field electric field information, if the difference exceeds the predetermined threshold.

In one embodiment, the facet information obtaining module comprises:

a preprocessing submodule, configured to perform digital model preprocessing on the model data information of the radome, to obtain simplified model data information of the radome; wherein the simplified model data information of the radome determines a center of the antenna aperture surface as an origin of a plane coordinate system, and the antenna aperture surface and the plane coordinate system are located on the same plane; and a split facet information extracting submodule, configured to perform discrete splitting and extracting operations on the simplified model data information of the radome, to obtain the split facet information of the radome.

In one embodiment, the split facet information of the radome comprises a center point coordinate (x, y, z) of a split facet, a normal vector $\hat{n}_c$ of the split facet, and an area ds of the split facet; and the far-field information calculating module comprises:

an incident field calculating submodule, configured to calculate incident field information radiated by the antenna to the radome according to the electric field information of the antenna aperture surface and the split facet information of the radome, wherein the incident field information of an inner surface of the radome comprises an electric field vector $E_{i1}$ and a magnetic field vector $H_{i1}$ of an incident field at a field point that is located on the $i^{th}$ split facet, and perform calculation operation according to the following formulas:

$$E_{i1} = -\frac{1}{4\pi}\int_s (E_a \times \hat{n}_a) \times \hat{\rho}\left(jk + \frac{1}{\rho}\right)\frac{e^{-jk\rho}}{\rho}ds,$$

$$H_{i1} = \frac{1}{j4\pi\omega\mu}\int_s \left[-(E_a \times \hat{n}_a)\frac{1}{\rho}\left(jk + \frac{1}{\rho}\right) + k^2(E_a \times \hat{n}_a)\right]\frac{e^{-jk\rho}}{\rho}ds' +$$

$$\frac{1}{j4\pi\omega\mu}\int_s [(E_a \times \hat{n}_a)\hat{\rho}]\hat{\rho}\left(-k^2 + \frac{3jk}{\rho} + \frac{3}{\rho^2}\right)\frac{e^{-jk\rho}}{\rho}ds';$$

wherein $\lambda_0$ represents a free-space wavelength, $k=2\pi/\lambda_0$ represents a free-space wave-number, $\varepsilon$ represents the permittivity, $\mu$ represents the permeability; $\omega=2\pi f$ represents an angular frequency, $f$ represents an operating frequency of the antenna, $\rho=|r-r'|$ represents a distance from a source point to the field point on the radome, $$\hat{\rho} = \frac{r - r'}{|r - r'|}$$

represents a unit vector of $\rho$; r is a position vector of the field point on the radome, r' is a position vector of the source point on the antenna aperture; $\hat{n}_a$ is a unit normal vector of the antenna aperture, the electric field information of the antenna aperture surface comprises an electric field $E_a$ excited by the antenna aperture, and i is an integer greater than 1.

In one embodiment, the far-field information calculating module further comprises:

a scattering parameter obtaining submodule, configured to obtain scattering parameter information of the radome;

a transmission field information calculating submodule, configured to calculate transmission field information of the radome according to the scattering parameter information of the radome and the incident field information radiated by the antenna to the radome, wherein the transmission field information comprises an electric field vector $E_{o1}$ and a magnetic field vector $H_{o1}$ of a primary transmission field, an electric field vector $E_{o2}$ and a magnetic field vector $H_{o2}$ of a secondary transmission field; and an antenna system far-field calculating submodule, configured to calculate the far-field information $E^r(\theta,\phi)$ of the antenna system, according to the transmission field information of the radome and the split facet information of the radome, by using the following formulas:

$$E_i^t(\theta, \phi) = \frac{-jk}{4\pi} \frac{e^{-jkr}}{r} \hat{r} \times \int_s \left[ (\hat{n} \times E_{o1}(r)) - \sqrt{\frac{\mu}{\varepsilon}} \hat{r} \times (\hat{n} \times H_{o1}(r)) \right] e^{-jkr'} ds,$$

$$E_r^t(\theta, \phi) =$$

$$\frac{-jk}{4\pi} \frac{e^{-jkr}}{r} \hat{r} \times \int_s \left[ (\hat{n} \times E_{o2}(r)) - \sqrt{\frac{\mu}{\varepsilon}} \hat{r} \times (\hat{n} \times H_{o2}(r)) \right] e^{-jkr'} ds, \text{ and}$$

$$E^t(\theta, \phi) = E_i^t(\theta, \phi) + E_r^t(\theta, \phi).$$

In one embodiment, the transmission field information calculating submodule comprises:

a polarizational decomposition unit, configured to perform, according to an incident surface $\hat{n}_c \times \hat{k}_{i1}$ defined by the normal vector $\hat{n}_c$ of the split facet and a propagating direction vector $\hat{k}_{i1}$ of an incident wave and a unit vector $\hat{e}_{i1}$ of the incident electric field in a polarization direction, polarizational decomposition on a horizontal direction vector $\hat{e}_\sqcap$ and a vertical direction vector $\hat{e}_\perp$ of an incident electromagnetic field along the incident surface, and calculating a vertical polarization wave component $E_{i1}^\perp$ and a horizontal polarization wave component $\mathbf{E}_{i1}^\sqcap$ respectively by using the following formulas:

$$E_{i1}^\perp = (E_{i1} \cdot \hat{e}_\perp) \hat{e}_\perp, \quad \mathbf{E}_{i1}^\sqcap = (E_{i1} \cdot \hat{\mathbf{e}}_\sqcap) \hat{\mathbf{e}}_\sqcap,$$

$$H_{i1}^\perp = (H_{i1} \cdot \hat{e}_\perp) \hat{e}_\perp, \quad \mathbf{H}_{i1}^\sqcap = (H_{i1} \cdot \hat{\mathbf{e}}_\sqcap) \hat{\mathbf{e}}_\sqcap;$$

$$\hat{e}_\perp = \hat{\mathbf{e}}_{i1} \cdot (\hat{n}_c \times \hat{k}_{i1}), \text{ and } \hat{\mathbf{e}}_\sqcap = \hat{e}_\perp \times \hat{k}_{i1}; \text{ and}$$

the scattering parameter information comprises an amplitude $S11^\perp$ and a phase $\phi_{11}^\perp$ of a vertical polarization wave reflecting coefficient $S11$, an amplitude $S11^\sqcap$ and a phase $\phi_{11}^\sqcap$ of a horizontal polarization wave reflecting coefficient $S11'$; an amplitude $S21^\perp$ and a phase $\phi_{21}^\perp$ of a vertical polarization wave transmitting coefficient $S21$, an amplitude $S21^\sqcap$ and a phase $\phi_{21}^\sqcap$ of a horizontal polarization wave transmitting coefficient $S21'$; and a transmission field information calculating unit, configured to calculate a vertical component $E_{o1}^\perp$ and a horizontal component $E_{o1}^{//}$ of the electric field vector of the primary transmission field, a vertical component $H_{o1}^\perp$ and a horizontal component $H_{o1}^{//}$ of the magnetic field vector of the primary transmission field, based on propagation characteristics of a plane electromagnetic field and the scattering parameter information, by using the following formulas:

$$\begin{cases} E_{o1}^\perp = E_{i1}^\perp S21^\perp e^{j(\phi_{21}^\perp - \frac{2\pi d}{\lambda} \cos\theta_{i1})}, & E_{o1}^\sqcap = E_{i1}^\sqcap S21^\sqcap e^{j(\phi_{21}^\sqcap - \frac{2\pi d}{\lambda} \cos\theta_{i1})} \\ H_{o1}^\perp = H_{i1}^\perp S21^\perp e^{j(\phi_{21}^\sqcap - \frac{2\pi d}{\lambda} \cos\theta_{i1})}, & H_{o1}^\sqcap = H_{i1}^\sqcap S21^\sqcap e^{j(\phi_{21}^\perp - \frac{2\pi d}{\lambda} \cos\theta_{i1})} \end{cases};$$

wherein the incident field information comprises an incident angle $\theta_{i1}$;

obtain the electric field vector $E_{o1}$ of the primary transmission field based on the vertical component $E_{o1}^\perp$ and the horizontal component $E_{o1}^{//}$ of the electric field vector of the primary transmission field, and obtaining the magnetic field vector $H_{o1}$ of the primary transmission field based on the vertical component $H_{o1}^\perp$ and the horizontal component $H_{o1}^{//}$ of the magnetic field vector of the primary transmission field;

calculate an electric field vector $E^r$ and a magnetic field vector $H^r$ of the primary reflection field by using the following formulas:

$$\begin{cases} E^r = E_{i1}^\perp S11^\perp e^{j\phi_{11}^\perp} \hat{e}_\sqcap + (E_{o1}^\sqcap \times \hat{k}_r) S11^\sqcap e^{j\phi_{11}^\sqcap} \\ H^r = H_{i1}^\perp S11^\sqcap e^{j\phi_{11}^\sqcap} \hat{e}_\sqcap + (H_{i1}^\sqcap \times \hat{k}_r) S11^\perp e^{j\phi_{11}^\perp} \end{cases},$$

$\hat{k}_r = \hat{k}_{i1} - 2(\hat{n}_c \cdot \hat{\mathbf{k}}_{i1}) \hat{n}_c$; wherein $\hat{k}_r$ represents a reflection direction vector of the incident wave; and calculate an electric field vector $E_{i2}$ and a magnetic field vector $H_{i2}$ of a secondary incident field by using the following formulas:

$$E_{i2} = \frac{1}{j4\pi\omega\varepsilon} \int_s \left[ -(\hat{n} \times H^r) \frac{1}{\rho} \left( jk + \frac{1}{\rho} \right) + [(\hat{n} \times H^r) \cdot \hat{\rho}] \hat{\rho} \left( -k^2 + \frac{3jk}{\rho} + \frac{3}{\rho^2} \right) + \right.$$

$$\left. k^2 (\hat{n} \times H^r) \right] \frac{e^{-jk\rho}}{\rho} ds' - \frac{1}{4\pi} \int_s (E^r \times \hat{n}) \times \hat{\rho} \left( jk + \frac{1}{\rho} \right) \frac{e^{-jk\rho}}{\rho} ds'$$

and $$H_{i2} =$$

$$\frac{1}{j4\pi\omega\mu} \int_s \left[ -(E^r \times \hat{n}) \frac{1}{\rho} \left( jk + \frac{1}{\rho} \right) + [(E^r \times \hat{n}) \cdot \hat{\rho}] \hat{\rho} \left( -k^2 + \frac{3jk}{\rho} + \frac{3}{\rho^2} \right) + \right.$$

$$\left. k^2 (E^r \times \hat{n}) \right] \frac{e^{-jk\rho}}{\rho} ds' + \frac{1}{4\pi} \int_s (\hat{n} \times H^r) \times \hat{\rho} \left( jk + \frac{1}{\rho} \right) \frac{e^{-jk\rho}}{\rho} ds'.$$

In one embodiment, the scattering parameter obtaining submodule comprises:

a full-wave simulation unit, configured to perform full-wave simulation on the radome to obtain the scattering parameter information of the radome.

In one embodiment, the device for evaluating electrical performance specifically comprises:

a first obtaining module, configured to obtain parameter information of an electric field and a magnetic field on the antenna aperture surface or electric and magnetic current density vectors of an antenna surface, and obtain scattering parameter information of the radome;

a second obtaining module, configured to obtain parameter information of a split facet of the radome;

a far-field information calculating module, configured to calculate the far-field information of the antenna and the far-field information of the antenna system respectively based on the parameter information of the electric field and the magnetic field on the antenna aperture surface or the electric and magnetic current density vectors of the antenna surface, the scattering parameter information of the radome, and the parameter information of the split facet of the radome; and the electrical performance parameter calculating module, configured to calculate the electrical performance parameter information of the radome based on the far-field information of the antenna and the far-field information of the antenna system.

In one embodiment, the first obtaining module comprises:

a simulation submodule, configured to generate a radome simulation model based on the radome, wherein each of the radome and the radome simulation model comprises a plurality of microstructure stacks that have the same structure and are arranged in the same manner;

the simulation submodule further configured to perform full-wave simulation on the radome simulation model to obtain the scattering parameter information of the radome.

In one embodiment, the second obtaining module comprises:

a model obtaining submodule, configured to obtain model data information of the antenna and model data information of the radome;

a preprocessing submodule, configured to perform digital model preprocessing on the model data information of the antenna and the model data information of the radome, to obtain preprocessed data information of the antenna and preprocessed data information of the radome; wherein the preprocessed data information of the antenna and the preprocessed data information of the radome determine a center of the antenna aperture surface as an origin of a coordinate system, and the antenna aperture surface and the coordinate system are located on the same plane;

an electromagnetic information obtaining submodule, configured to obtain the parameter information of the electric field and the magnetic field on the antenna aperture surface or the electric and magnetic current density vectors of the antenna surface based on the preprocessed data information of the antenna; and a scattering parameter obtaining submodule, configured to obtain the scattering parameter information of the radome based on the preprocessed data information of the radome.

In one embodiment, the split facet information of the radome comprises a center point coordinate (x, y, z) of the split facet, a normal vector $\hat{n}_c$ of the split facet, and an area ds of the split facet;

the far-field information calculating module comprises:

an incident field calculating submodule, configured to calculate incident field information of an inner surface of the radome based on the electric current density vector J and the magnetic current density vector M of the antenna surface and the parameter information of the split facet of the radome, the incident field information of the inner surface of the radome comprising an electric field vector $E_{i1}$ and a magnetic field vector $H_{i1}$ of the incident field at a field point that is located on the $i^{th}$ split facet of the radome, and performing calculation operation according to the following formulas:

$$E_{i1} = \frac{1}{j4\pi\omega\varepsilon}\int_s\left[-J\frac{1}{\rho}\left(jk+\frac{1}{\rho}\right)+(J\Box\hat{\rho})\hat{\rho}\left(-k^2+\frac{3jk}{\rho}+\frac{3}{\rho^2}\right)+k^2J\right]\frac{e^{-jk\rho}}{\rho}ds -$$

$$\frac{1}{4\pi}\int_s M\times\hat{\rho}\left(jk+\frac{1}{\rho}\right)\frac{e^{-jk\rho}}{\rho}ds;$$

$$H_{i1} = \frac{1}{j4\pi\omega\mu}\int_s\left[-M\frac{1}{\rho}\left(jk+\frac{1}{\rho}\right)+(M\Box\hat{\rho})\hat{\rho}\left(-k^2+\frac{3jk}{\rho}+\frac{3}{\rho^2}\right)+k^2M\right]\frac{e^{-jk\rho}}{\rho}ds+\frac{1}{4\pi}\int_s J\times\hat{\rho}\left(jk+\frac{1}{\rho}\right)\frac{e^{-jk\rho}}{\rho}ds;$$

$$k=2\pi/\lambda_0,\ \omega=2\pi f,\ \hat{\rho}=\frac{r-r'}{|r-r'|},\ \text{and}\ \rho=|r-r'|;$$

wherein $\lambda_0$ represents a free-space wavelength, k represents a free-space wavenumber; ε represents the permittivity, μ represents the permeability; ω represents an angular frequency, $f$ represents an operating frequency of the antenna, ρ represents a distance from a source point to the field point on the radome, $$\hat{\rho}=\frac{r-r'}{|r-r'|}$$

represents a unit vector of ρ; r is a position vector of the field point on the randome; r' is a position vector of the source point on the antenna aperture; and i is an integer greater than 1; and an antenna far-field calculating submodule, configured to calculate the far-field information of the antenna according to the incident field information of the inner surface of the radome and the parameter information of the split facet of the radome.

In one embodiment, the far-field information calculating module further comprises:

a transmission field calculating submodule, configured to calculate transmission field information of the radome based on the scattering parameter information of the radome, the electric field vector $E_{i1}$ and the magnetic field vector $H_{i1}$ of the incident field, the transmission field information of the radome comprising an electric field vector $E_{o1}$ and a magnetic field vector $H_{o1}$ of a primary transmission field, an electric field vector $E_{o2}$ and a magnetic field vector $H_{o2}$ of a secondary transmission field; and the antenna system far-field calculating submodule, configured to calculate the far-field information $E^t$ of the antenna system, based on the transmission field information of the radome and the parameter information of the split facet of the radome, by using the following formulas:

$$E_i^t = \frac{-jk}{4\pi}\frac{e^{-jk\rho}}{\rho}\hat{r}\times\int_s\left[(\hat{n}\times E_{o1})-\sqrt{\frac{\mu}{\varepsilon}}\hat{r}\times(\hat{n}\times H_{o1})\right]e^{-jkr'}ds;$$

$$E_r^t = \frac{-jk}{4\pi}\frac{e^{-jk\rho}}{\rho}\hat{r}\times\int_s\left[(\hat{n}\times E_{o2})-\sqrt{\frac{\mu}{\varepsilon}}\hat{r}\times(\hat{n}\times H_{o2})\right]e^{-jkr'}ds;\ \text{and}$$

$$E^t = E_i^t + E_r^t;$$

wherein $E_i^t$ represents a far-field electric field vector of the primary transmission field, and $E_r^t$ represents a far-field electric field vector of the secondary transmission field.

In one embodiment, the transmission field calculating submodule comprises:

a polarizational decomposition unit, configured to perform, according to an incident surface $\hat{n}_c\times\hat{k}_{i1}$ defined by the normal vector $\hat{n}_c$ of the split facet and a propagating direction vector $\hat{k}_{i1}$ of an incident wave and a unit vector $\hat{e}_{r1}$ of the incident electric field in a polarization direction, polarizational decomposition on a horizontal direction vector $\hat{e}_\parallel$ and a vertical direction vector $\hat{e}_\perp$ of an incident electromagnetic field along the incident surface, and calculating a vertical polarization wave component $E_{i1}^\perp$ and a horizontal polarization wave component $\mathbf{E}_{i1}^\parallel$ respectively by using the following formulas:

$$E_{i1}^\perp = (E_{i1}\cdot\hat{\mathbf{e}}_\perp)\hat{e}_\perp,\ \mathbf{E}_{i1}^\parallel = (E_{i1}\cdot\hat{\mathbf{e}}_\parallel)\hat{\mathbf{e}}_\parallel;$$

$$H_{i1}^\perp = (H_{i1}\cdot\hat{\mathbf{e}}_\perp)\hat{e}_\perp,\ \mathbf{H}_{i1}^\parallel = (H_{i1}\cdot\hat{\mathbf{e}}_\parallel)\hat{\mathbf{e}}_\parallel;$$

$$\hat{e}_\perp = \hat{\mathbf{e}}_{r1}\cdot(\hat{n}_c\times\hat{k}_{i1}),\ \text{and}\ \hat{\mathbf{e}}_\parallel = \hat{e}_\perp\times\hat{k}_{i1};$$

wherein the scattering parameter information comprises an amplitude $S11^\perp$ and a phase $\phi_{11}^\perp$ of a vertical polarization wave reflecting coefficient S11, an amplitude $S11^\square$ and a phase $\phi_{11}^\square$ of a horizontal polarization wave reflecting coefficient S11'; an amplitude $S21^\perp$ and a phase $\phi_{21}^\perp$ of a vertical polarization wave transmitting coefficient S21, an amplitude $S21^\square$ and a phase $\phi_{21}^\square$ of horizontal polarization wave transmitting coefficient S21'; and a transmission field information calculating unit, configured to calculate a vertical component $E_{o1}^\perp$ and a horizontal component $E_{o1}^{//}$ of the electric field vector of the primary transmission field, a vertical component $H_{o1}^\perp$ and a horizontal component $H_{o1}^{//}$ of the magnetic field vector of the primary transmission field, based on propagation characteristics of a plane electromagnetic field and the scattering parameter information, by using the following formulas:

$$\begin{cases} E_{o1}^\perp = E_{i1}^\perp S21^\perp e^{j\left(\phi_{21}^\perp - \frac{2\pi d}{\lambda}\cos\theta_{i1}\right)}, E_{o1}^\square = E_{i1}^\square S21^\square e^{j\left(\phi_{21}^\square - \frac{2\pi d}{\lambda}\cos\theta_{i1}\right)} \\ H_{o1}^\perp = H_{i1}^\perp S21^\square e^{j\left(\phi_{21}^\square - \frac{2\pi d}{\lambda}\cos\theta_{i1}\right)}, H_{o1}^\square = H_{i1}^\square S21^\perp e^{j\left(\phi_{21}^\perp - \frac{2\pi d}{\lambda}\cos\theta_{i1}\right)} \end{cases};$$

wherein the incident field information comprises an incident angle $\theta_{i1}$;

obtain the electric field vector $E_{o1}$ of the primary transmission field according to the vertical component $E_{o1}^\perp$ and the horizontal component $E_{o1}^{//}$ of the electric field vector of the primary transmission field, and obtaining the magnetic field vector $H_{o1}$ of the primary transmission field based on the vertical component $H_{o1}^\perp$ and the horizontal component $H_{o1}^{//}$ of the magnetic field vector of the primary transmission field;

calculate an electric field vector $E^r$ and a magnetic field vector $H^r$ of the primary reflection field by using the following formulas:

$$\begin{cases} E^r = E_{i1}^\perp S11^\perp e^{j\phi_{11}^\perp} + (E_{o1}^\square \times \hat{k}_r)S11^\square e^{j\phi_{11}^\square} \\ H^r = H_{i1}^\perp S11^\square e^{j\phi_{11}^\square} + (H_{i1}^\square \times \hat{k}_r)S11^\perp e^{j\phi_{11}^\perp} \end{cases};$$

$\hat{k}_r = \hat{k}_{i1} - 2(\hat{n}_c \cdot \hat{k}_{i1})\hat{n}_c$;

wherein $\hat{k}_r$ represents a reflection direction vector of the incident wave; and calculate an electric field vector $E_{i2}$ and a magnetic field vector $H_{i2}$ of a secondary incident field by using the following formulas:

$$E_{i2} = \frac{1}{j4\pi\omega\varepsilon}\int_s \left[-(\hat{n}\times H^r)\frac{1}{\rho}\left(jk+\frac{1}{\rho}\right) + [(\hat{n}\times H^r)\square\hat{\rho}]\hat{\rho}\left(-k^2+\frac{3jk}{\rho}+\frac{3}{\rho^2}\right)+\right.$$
$$\left. k^2(\hat{n}\times H^r)\right]\frac{e^{-jk\rho}}{\rho}ds' - \frac{1}{4\pi}\int_s (E^r\times\hat{n})\times\hat{\rho}\left(jk+\frac{1}{\rho}\right)\frac{e^{-jk\rho}}{\rho}ds',$$

and $$H_{i2} = \frac{1}{j4\pi\omega\mu}\int_s \left[-(E^r\times\hat{n})\frac{1}{\rho}\left(jk+\frac{1}{\rho}\right) + [(E^r\times\hat{n})\square\hat{\rho}]\hat{\rho}\left(-k^2+\frac{3jk}{\rho}+\frac{3}{\rho^2}\right)+\right.$$
$$\left. k^2(E^r\times\hat{n})\right]\frac{e^{-jk\rho}}{\rho}ds' + \frac{1}{4\pi}\int_s (\hat{n}\times H^r)\times\hat{\rho}\left(jk+\frac{1}{\rho}\right)\frac{e^{-jk\rho}}{\rho}ds'.$$

In one embodiment, the second obtaining module comprises:

a splitting and extracting submodule, configured to split preprocessed data information of the radome, and extract the parameter information of the split facet of the radome from the preprocessed data information of the radome after splitting.

In one embodiment, the preprocessing submodule comprises a simplification processing unit, a translation processing unit, and a rotation processing unit, and the simplification processing unit, the translation processing unit, and the rotation processing unit are respectively configured to perform simplification processing, translation processing, and rotation processing on the model data information of the radome.

In the present invention, the far field information of the antenna and the far field information of the antenna system are calculated by using the electromagnetic parameter information of the antenna and the parameter information of the radome that are obtained through actual measurement, and then the electrical performance parameter information of the radome is obtained. In this way, calculation precision is ensured without relying on a precise digital model of the antenna or when the antenna system is relatively complex, operability of evaluating electrical performance of the radome is greatly enhanced, and the calculation precision is effectively improved.

BRIEF DESCRIPTION OF DRAWINGS

To describe the technical solutions in the embodiments of the present application or the prior art more clearly, the following briefly describes the accompanying drawings required in the embodiments. Apparently, the accompanying drawings in the following description show merely some embodiments of the present application, and persons of ordinary skill in the art may still derive other drawings from these accompanying drawings without creative efforts.

DESCRIPTION OF EMBODIMENTS

Figure 1:
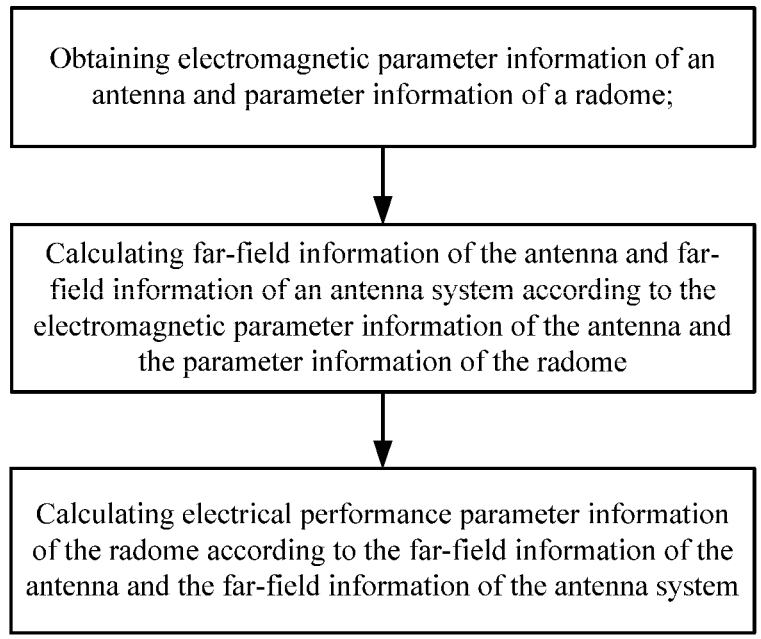
FIG. 1 is a flowchart of a method for evaluating electrical performance of a radome according to the present invention.

According to an embodiment of the present invention, a method for evaluating electrical performance of a radome is provided. As shown in FIG. 1, the method includes the following steps:

obtaining electromagnetic parameter information of an antenna and parameter information of the radome;

calculating far-field information of the antenna and far-field information of an antenna system according to the electromagnetic parameter information of the antenna and the parameter information of the radome; and calculating the electrical performance parameter information of the radome according to the far-field information of the antenna and the far-field information of the antenna system.

Figure 2:
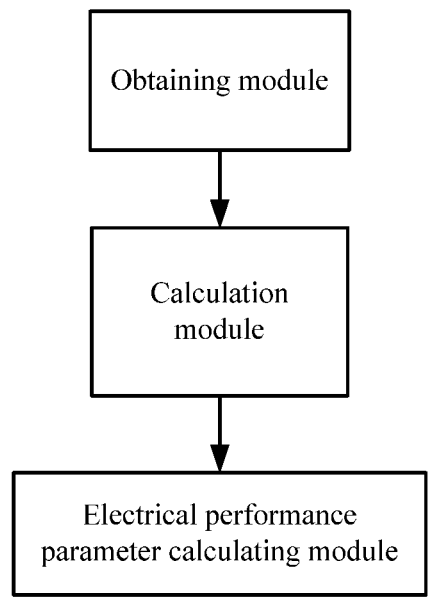
FIG. 2 is a block diagram of a device for evaluating electrical performance of a radome according to the present invention.

According to an embodiment, as shown in FIG. 2, a device for evaluating electrical performance of the radome is further provided. The device for evaluating electrical performance is configured to perform the method for evaluating electrical performance of the radome in the above-mentioned embodiment. The device for evaluating electrical performance includes:

an obtaining module, configured to obtain electromagnetic parameter information of the antenna and parameter information of the radome;

a calculation module, configured to calculate far-field information of the antenna and far-field information of the antenna system according to the electromagnetic parameter information of the antenna and the parameter information of the radome; and an electrical performance parameter calculating module, configured to calculate electrical performance parameter information of the radome according to the far-field information of the antenna and the far-field information of the antenna system.

The method and device for evaluating electrical performance of the radome according to the present invention, calculate the far-field information of the antenna and the far-field information of the antenna system, according to the electromagnetic parameter information of the antenna and the parameter information of the radome that are obtained through actual measurement, so as to obtain electrical performance parameter information of the radome. Therefore, calculation accuracy is ensured without relying on a precise digital model of the antenna or a relatively complex antenna system, operability of evaluating electrical performance of the radome is greatly enhanced, and the calculation accuracy is effectively improved.

Embodiment 1

Figure 3:
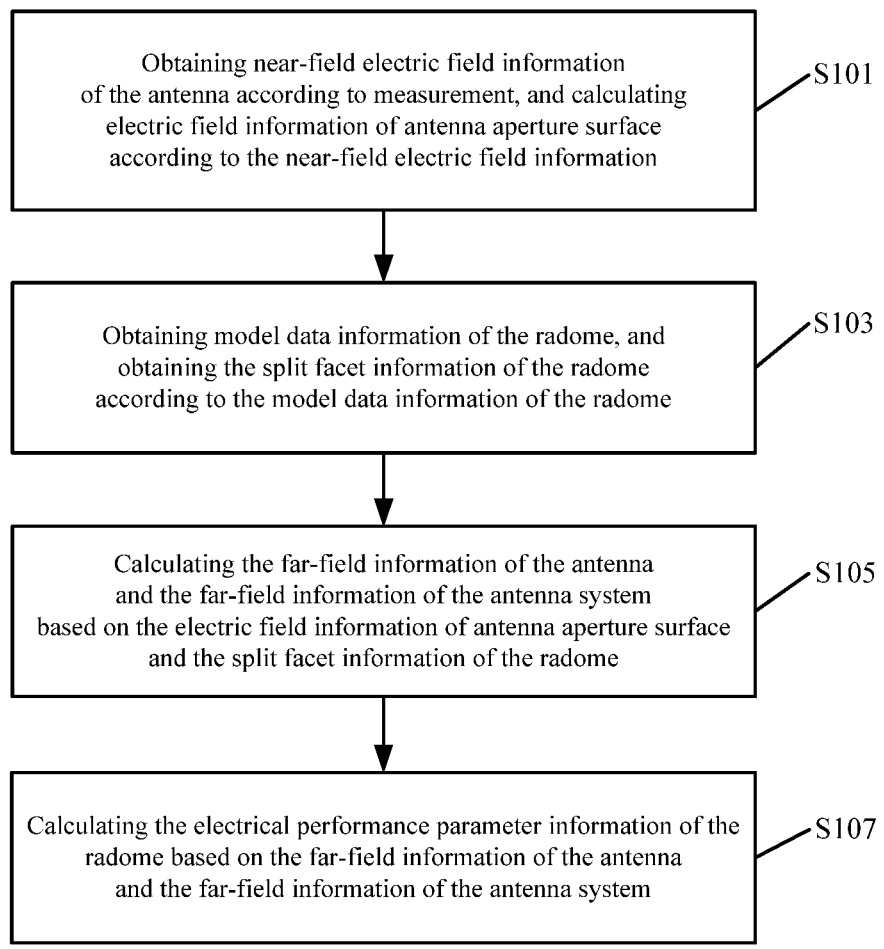
FIG. 3 is a flowchart of Embodiment 1 of a method for evaluating electrical performance of a radome according to the present invention.

The following section describes the present invention in detail by using a specific embodiment. As shown in FIG. 3, a method for evaluating electrical performance of a radome specifically includes the following steps:

Step S101. obtaining near-field electric field information of the antenna according to the measurement, and calculating electric field information of antenna aperture surface according to the near-field electric field information.

Step S103. obtaining model data information of the radome, and obtaining split facet information of the radome according to the model data information of the radome.

Step S105. calculating the far-field information of the antenna and the far-field information of the antenna system based on the electric field information of the antenna aperture surface and the split facet information of the radome.

Step S107. calculating the electrical performance parameter information of the radome based on the far-field information of the antenna and the far-field information of the antenna system.

Through the above solution of the present invention, calculation accuracy can be ensured without relying on a precise digital model of the antenna or a relatively complex antenna system, operability of evaluating electrical performance of the radome is greatly enhanced, and the calculation accuracy is effectively improved.

Figure 4:
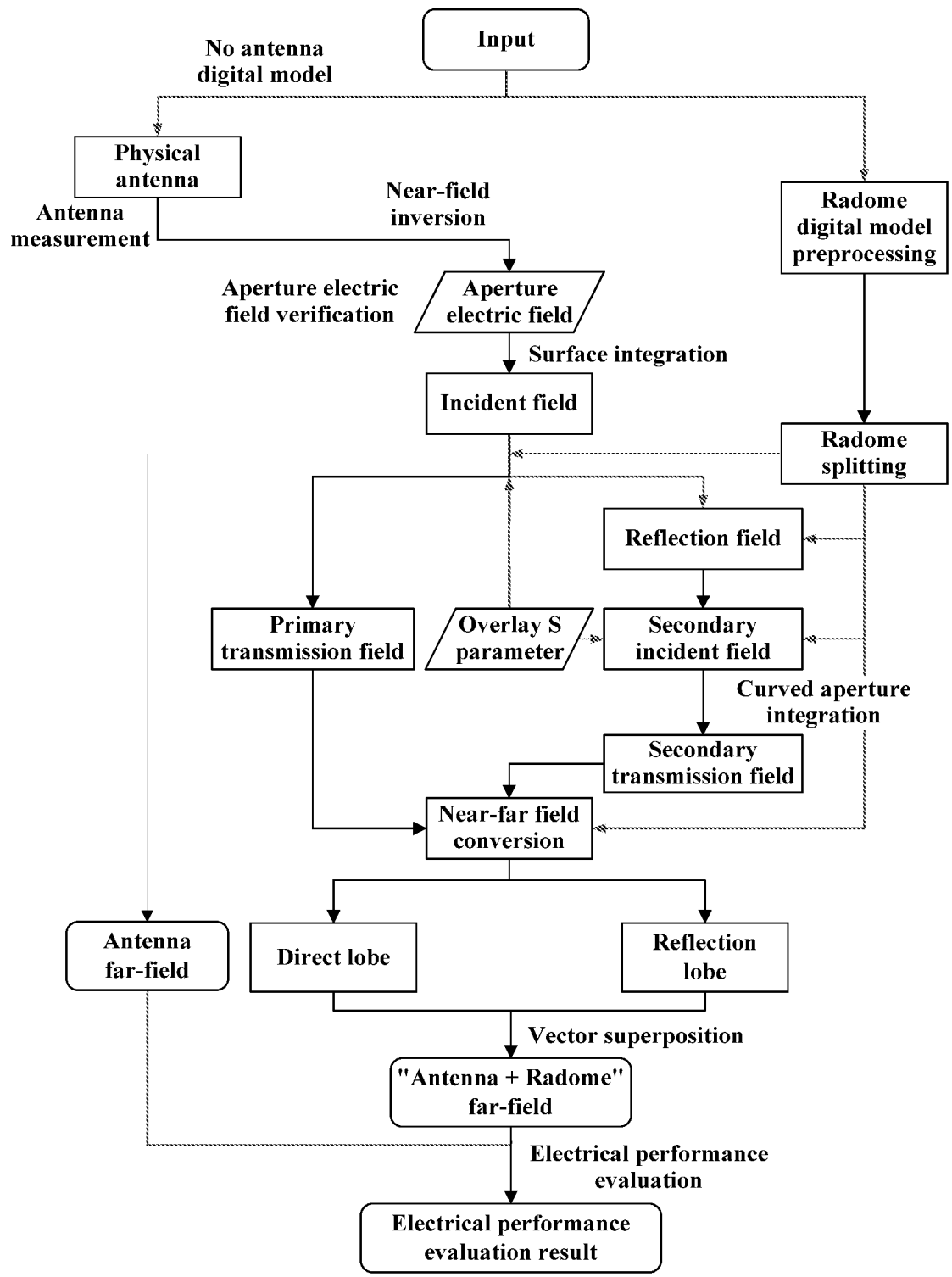
FIG. 4 is an embodiment flowchart of Embodiment 1 of the method for evaluating electrical performance of a radome according to the present invention.
Figure 5:
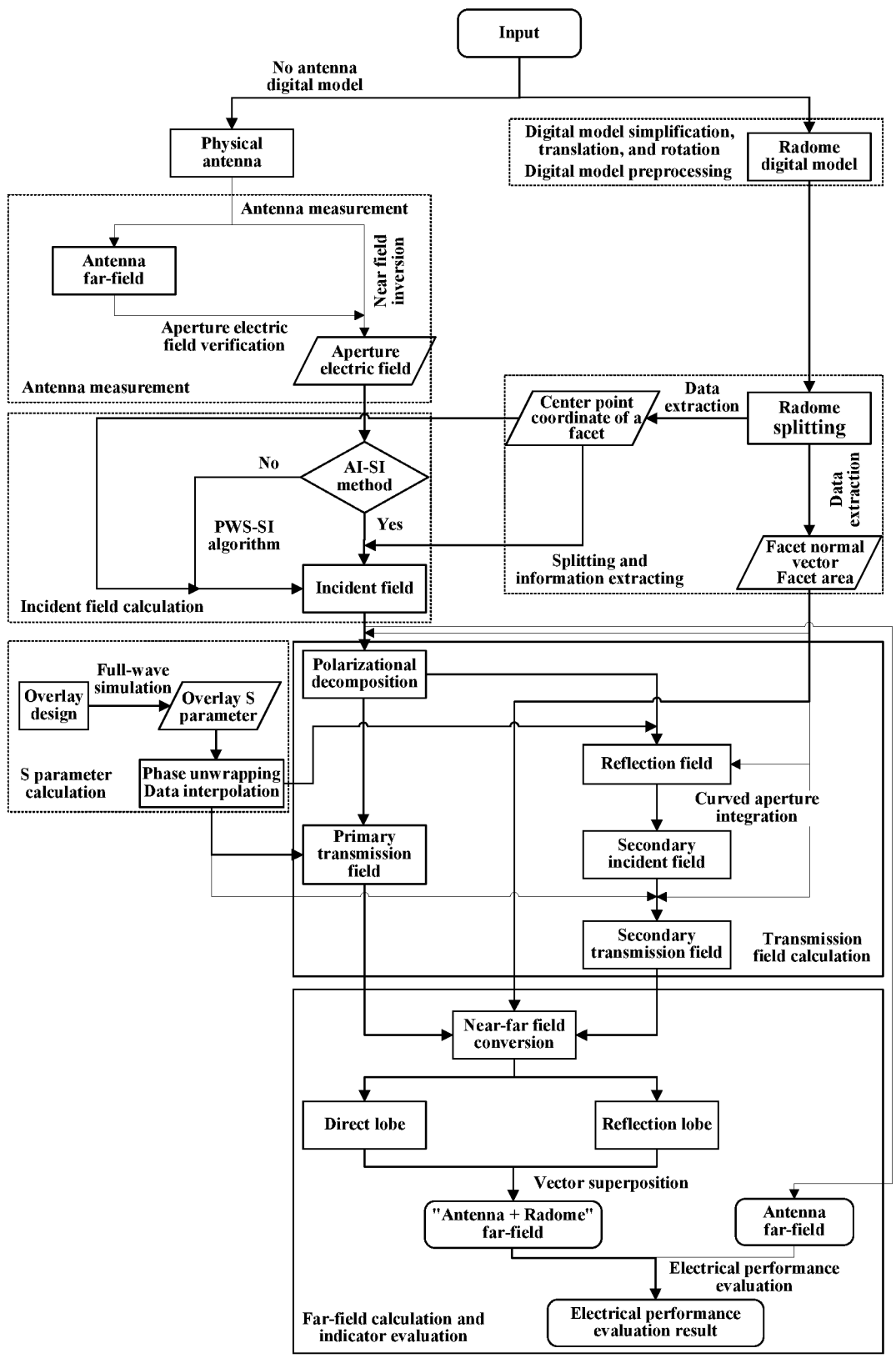
FIG. 5 is a specific embodiment flowchart of Embodiment 1 of the method for evaluating electrical performance of a radome according to the present invention.

FIG. 4 and FIG. 5 show specific embodiments of the method for evaluating electrical performance of a radome according to the present invention. The following section specifically describes the method for evaluating electrical performance according to the present invention according to FIG. 4 and FIG. 5.

As shown in FIG. 4 and FIG. 5, firstly, digital model input (model data information) of the radome is obtained. The model data information includes related information for representing operating status of the antenna and the radome, such as model parameters of the radome, position information of the antenna and the radome, the feeding form and the operating frequency range of the antenna.

As shown in FIG. 4 and FIG. 5, the method for evaluating electrical performance enters a digital model preprocessing stage. Digital model preprocessing is to perform simplification, translation, rotation processing or the like on the model data information of the radome, such that the simplified model of the radome uses a center of the antenna aperture surface as an origin of the coordinate system, and the plane of the antenna aperture surface is located on the plane of the coordinate axis. Wherein, the simplification processing is to simplify the complex model data information.

Referring to FIG. 4 and FIG. 5, after the digital model preprocessing of the radome, the method for evaluating electrical performance further includes splitting and information extracting stage, which is mainly intended for model data parameter information of the radome.

With continued reference to FIG. 4 and FIG. 5, the method for evaluating electrical performance enters an incident field calculating stage. At this stage, firstly, it is determined whether there is a precise digital model of the antenna or a relatively complex antenna system. The antenna cannot be accurately simulated due to many reasons. Only one of the reasons is cited as a reference in the present invention. For example, in actual evaluation of the electrical performance of the radome, the vendor does not provide the real digital model of the antenna due to confidential reasons.

In the case that the electric field information of the antenna aperture surface cannot be obtained through simulation, the method for evaluating electrical performance provided in the present invention can obtain near-field information by measuring a near field (near-zone radiation) of the antenna. Wherein the near-field information is used to represent electric field distribution of the near field, and includes but is not limited to an amplitude, a phase, a spatial coordinate, or the like. Through the actual measurement of near-field information, the electric field distribution on a plane, which is at any distance from the antenna aperture surface and is parallel to the antenna aperture surface, is calculated by using the back projection algorithm, which is determined as the electric field information of the antenna aperture surface.

To ensure that the calculated electric field information of the aperture surface is the same as the actual electric field parameter of the aperture surface, verification needs to be performed. Specifically, near-far-field conversion processing is performed on the calculated electric field on the antenna aperture surface, so as to obtain corresponding far-field information. The obtained far-field information is compared with an actually measured far-field. If a difference between them exceeds a predetermined threshold, it indicates that the near-field information obtained through measurement is lacking. As a result, near-far-field calculation is not converged. It is necessary to adjust test parameters of the antenna, and measure the near-field electric field information of the antenna again. If the difference between them does not exceed the predetermined threshold, it is considered that the electric field information of the antenna aperture surface is approximate to an actual field $E_a(x_0, y_0, z_0)$ of the antenna aperture surface.

Referring to FIG. 4 and FIG. 5 again, after the digital model preprocessing stage, the method for evaluating electrical performance further includes splitting and information extracting stage, which is mainly intended for model data parameter information of the radome. At this stage, the pre-processed inner wall of the radome is discretely split to obtain a plurality of corresponding discrete facets of the radome. The position of the discrete point can be represented by the center point coordinate (x, y, z) of the facet. The split facet information includes the center point coordinate (x, y, z) of the split facet, a normal vector $\hat{n}_c$ of the split facet, and an area ds of the split facet.

Then, different algorithms are selected, according to information extracted from the antenna simulation and the split facet, to calculate the incident field information radiated by the antenna to the inner wall of the radome. The incident field information includes an electric field vector $E_{i1}$ and a magnetic field vector $H_{i1}$ of the incident field at corresponding field point that is located on the $i^{th}$ split facet, a propagating direction vector $\hat{k}_{i1}$ of an incident wave, an incident angle $\theta_{i1}$, and the electric field polarization angle $\beta_{i1}$, where i is an integer greater than 1.

A method for calculating the electric field vector $E_{i1}$ and the magnetic field vector $H_{i1}$ of the incident field includes: 1. an aperture integration-surface integration algorithm (AI-SI algorithm) calculated according to the electric field and the magnetic field on the aperture surface and the center point coordinate of the split facet; 2. a plane wave spectrum-surface integration algorithm (PWS-SI algorithm) calculated according to the electric field and the magnetic field on the aperture surface and the center point coordinate of the split facet.

Preferably, the method for evaluating electrical performance further includes the step of calculating the electric field vector $E_{i1}$ and the magnetic field vector $H_{i1}$ of the incident field, based on the AI-SI algorithm, by using the following formulas:

$$E_{i1} = -\frac{1}{4\pi} \int_s (E_a \times \hat{n}_a) \times \hat{\rho}\left(jk + \frac{1}{\rho}\right)\frac{e^{-jk\rho}}{\rho} ds, \text{ and}$$

$$H_{i1} = \frac{1}{j4\pi\omega\mu} \int_s \left[-(E_a \times \hat{n}_a)\frac{1}{\rho}\left(jk + \frac{1}{\rho}\right) + k^2(E_a \times \hat{n}_a)\right]\frac{e^{-jk\rho}}{\rho} ds' +$$

$$\frac{1}{j4\pi\omega\mu} \int_s [(E_a \times \hat{n}_a)\Box\hat{\rho}]\hat{\rho}\left(-k^2 + \frac{3jk}{\rho} + \frac{3}{\rho^2}\right)\frac{e^{-jk\rho}}{\rho} ds'.$$

Where $\lambda_0$ represents a free-space wavelength, $k=2\pi/\lambda_0$ represents a free-space wavenumber, $\varepsilon$ represents the permittivity, $\mu$ represents the permeability, $\omega=2\pi f$ represents an angular frequency, $f$ represents an operating frequency of the antenna; $\rho=|r-r'|$ represents a distance from a source point to the field point on the radome, $$\hat{\rho} = \frac{r - r'}{|r - r'|}$$

represents a unit vector of $\rho$, r is a position vector of the field point on the radome, r' is a position vector of the source point on the antenna aperture, $\hat{n}_a$ is a unit normal vector of the antenna aperture.

Optionally, the method further includes the step of calculating the electric field vector $E_{i1}$ of the incident field, based on the PWS-SI algorithm, by using the following formulas:

$$E_{i1} = \frac{1}{2\pi} \int\int \Omega(k_x, k_y) e^{-j(k_x x + k_y y + k_z z)} dk_x dk_y, \text{ and}$$

$$\Omega(k_x, k_y) = \frac{1}{2\pi} \int\int E^t(x_0, y_0, z_0) e^{-j(k_x x + k_y y)} dxdy.$$

Wherein $(x_0, y_0, z_0)$ is the coordinate of a source point on the antenna aperture, (x,y,z) is the coordinate of a field point on the radome, $E^t(x_0, y_0, z_0)$ is a tangential component of $E_a(x_0, y_0, z_0)$ in the electric field information $E_a$ of the antenna aperture surface, $k_x$ represents an x-axis component of a free-space vector wavenumber in a three-dimensional cartesian coordinate system, and $k_y$ represents a y-axis component of the free-space vector wavenumber in the three-dimensional cartesian coordinate system.

Further, the method further includes the step of calculating the propagating direction vector $\hat{k}_{i1}$ of the incident wave, the incident angle $\theta_{i1}$, and the electric field polarization angle $\beta_{i1}$ respectively by using the following formulas:

$$\hat{k}_{i1} = \text{Re}(E_{i1} \times H_{i1}^*)/|\text{Re}(E_{i1} \times H_{i1}^*)|;$$

$$\theta_{i1} = \arccos\left(\frac{\hat{n}_c \Box \hat{k}_{i1}}{|\hat{n}_c \Box \hat{k}_{i1}|}\right); \text{ and}$$

$$\beta_{i1} = \arcsin\left[\frac{(\hat{k}_{i1} \times \hat{n}_c)\Box\hat{e}_{i1}}{|(\hat{k}_{i1} \times \hat{n}_c)\Box\hat{e}_{i1}|}\right];$$

where $\hat{e}_{i1}$ is a unit vector of the incident electric field in the polarization direction, Re represents the real part, and $H^*_{i1}$ is a conjugate number of $H_{i1}$.

Referring to FIG. 4 and FIG. 5, the method for evaluating electrical performance further includes the stage for calculating scattering parameters of stacked layers of the radome. This mainly means that the radome is approximate to the form of a combination of periodic stacked layers. The method includes following steps: performing full-wave simulation on a single periodic stacked layer combined with periodic boundaries, and obtaining scattering parameters of the plane waves that are respectively parallel and perpendicular to the incident surface at different frequency points and different incident angles.

The method further includes the following steps: according to the frequency point that needs to be calculated for evaluating the electrical performance, performing an interpolation operation in frequency dimension on the obtained scattering parameter information at each incident angle. Then, extracting the scattering parameter information at the calculated frequency point that varies according to the incident angle, and unwrapping the phase information in the scattering parameter, that is, periodic extension operation is performed on the phase. Then, interpolation processing in the dimension of the incident angle is performed, according to the incident angle calculated at the incident field calculating stage, on the scattering parameter at the calculated frequency point that varies according to an incident angle, so as to obtain scattering parameter information at the calculated frequency point and at the incident angle corresponding to a center point of each split facet on the inner wall of the radome. The scattering parameter information includes an amplitude $S11^\perp$ and a phase $\phi_{11}^\perp$ of a vertical polarization wave reflecting coefficient $S11$, an amplitude $S11^\square$ and a phase $\phi_{11}^\Gamma$ of a horizontal polarization wave reflecting coefficient $S11'$; an amplitude $S21^\perp$ and a phase $\phi_{21}^\perp$ of a vertical polarization wave transmitting coefficient $S21$, an amplitude $S21^\square$ and a phase $\phi_{21}^\square$ of a horizontal polarization wave transmitting coefficient $S21'$.

Referring to FIG. 4 and FIG. 5, the method for evaluating electrical performance further includes a transmission electromagnetic field calculating stage. At this stage, the method includes following steps: performing, based on an incident surface $\hat{n}_c \times \hat{k}_{i1}$ defined by the normal vector $\hat{n}_c$ of the split facet and a propagating direction vector $\hat{k}_{i1}$ of an incident wave and a unit vector $\hat{e}_{i1}$ of the incident electric field in a polarization direction, polarizational decomposition on a horizontal direction vector $\hat{e}_\parallel$ and a vertical direction vector $\hat{e}_\perp$ of an incident electromagnetic field along the incident surface, and calculating a vertical polarization wave component $E_{i1}^\perp$ and a horizontal polarization wave component $\mathbf{E}_{i1}^\square$ respectively by using the following formulas:

$$\hat{e}_\perp = \hat{e}_{i1}^\Gamma (\hat{n}_c \times \hat{k}_{k1}) \text{ and } \hat{e}_\parallel = \hat{e}_\perp \times \hat{k}_{i1}, \text{ and}$$

$$E_{i1}^\perp = (E_{i1} \cdot \hat{e}_\perp)\hat{e}_\perp, \ \mathbf{E}_{i1}^\square = (E_{i1}^\Gamma \hat{e}_\square) \hat{e}_\square, \text{ and } H_{i1}^\perp = (H_{i1} \cdot \hat{e}_\perp)\hat{e}_\perp, \ \mathbf{H}_{i1}^\square = (H_{i1}^\Gamma \hat{e}_\square) \hat{e}_\square.$$

The method further includes following steps: performing an operation on orthogonal polarization waves and the scattering parameter information based on propagation characteristics of an electromagnetic wave, and performing vector superposition operation; calculating a vertical component $E_{o1}^\perp$ and a horizontal component $E_{o1}^{//}$ of an electric field vector of the primary transmission field, a vertical component $H_{o1}^\perp$ and a horizontal component $H_{o1}^{//}$ of a magnetic field vector of the primary transmission field, an electric field vector $E^r$ and a magnetic field vector $H^r$ of the primary reflection field respectively by using the following formulas:

$$\begin{cases} E_{o1}^\perp = E_{i1}^\perp S21^\perp e^{j(\phi_{21}^\perp - \frac{2\pi d}{\lambda}\cos\theta_{i1})}, \ E_{o1}^\square = E_{i1}^\square S21^\square e^{j(\phi_{21}^\square - \frac{2\pi d}{\lambda}\cos\theta_{i1})} \\ H_{o1}^\perp = H_{i1}^\perp S21^\perp e^{j(\phi_{21}^\perp - \frac{2\pi d}{\lambda}\cos\theta_{i1})}, \ H_{o1}^\square = H_{i1}^\square S21^\perp e^{j(\phi_{21}^\square - \frac{2\pi d}{\lambda}\cos\theta_{i1})} \end{cases};$$

$$\begin{cases} E^r = E_{i1}^\perp S11^\perp e^{j\phi_{11}^\perp} + (E_{o1}^\square \times \hat{k}_r) S11^\square e^{j\phi_{11}^\square}, \\ H^r = H_{i1}^\square S11^\square e^{j\phi_{11}^\square} + (H_{i1}^\square \times \hat{k}_r) S11^\perp e^{j\phi_{11}^\perp}, \end{cases}$$

$\hat{k}_r = \hat{k}_{i1} - 2(\hat{n}_c \Gamma \hat{\mathbf{k}}_{i1}) \hat{n}_c$, $\hat{k}_r$ representing a reflection direction vector of an incident wave.

Furthermore, the method further includes following steps: obtaining the electric field vector $E_{o1}$ of the primary transmission field based on the vertical component $E_{o1}^\perp$ and the horizontal component $E_{o1}^{//}$ of the electric field vector of the primary transmission field, and obtaining the magnetic field vector $H_{o1}$ of the primary transmission field based on the vertical component $H_{o1}^\perp$ and the horizontal component $H_{o1}^{//}$ of the magnetic field vector of the primary transmission field.

The method further includes the step of calculating a reflection propagating field of each field point relative to a reflection field, based on the determination of an inner surface of the radome as an integral field point, by using a curved aperture integral method, so as to obtain an electric field vector $E_{i1}$ and a magnetic field vector $H_{i2}$ of the secondary incident field at the field point on the radome. Calculation formulas related to the curved aperture integral method are as follows:

$$E_{i2} = \frac{1}{j4\pi\omega\varepsilon} \int_s \left[ -(\hat{n} \times H^r)\frac{1}{\rho}\left(jk + \frac{1}{\rho}\right) + [(\hat{n} \times H^r) \square \hat{\rho}]\hat{\rho}\left(-k^2 + \frac{3jk}{\rho} + \frac{3}{\rho^2}\right) + k^2(\hat{n} \times H^r) \right] \frac{e^{-jk\rho}}{\rho} ds' - \frac{1}{4\pi} \int_s (E^r \times \hat{n}) \times \hat{\rho}\left(jk + \frac{1}{\rho}\right) \frac{e^{-jk\rho}}{\rho} ds',$$

and $$H_{i2} = \frac{1}{j4\pi\omega\mu} \int_s \left[ -(E^r \times \hat{n})\frac{1}{\rho}\left(jk + \frac{1}{\rho}\right) + [(E^r \times \hat{n}) \square \hat{\rho}]\hat{\rho}\left(-k^2 + \frac{3jk}{\rho} + \frac{3}{\rho^2}\right) + k^2(E^r \times \hat{n}) \right] \frac{e^{-jk\rho}}{\rho} ds' + \frac{1}{4\pi} \int_s (\hat{n} \times H^r) \times \hat{\rho}\left(jk + \frac{1}{\rho}\right) \frac{e^{-jk\rho}}{\rho} ds'.$$

Wherein $k = 2\pi/\lambda_0$ represents a free-space wavenumber, $\lambda_0$ represents a free-space wavelength, $\varepsilon$ represents the permittivity, $\mu$ represents the permeability, $\rho = |r - r'|$ represents a distance from a source point to a field point on the radome, $$\hat{\rho} = \frac{r - r'}{|r - r'|}$$

represents a unit vector of $\hat{\rho}$, $r$ represents a position vector of the field point, $r'$ represents a position vector of the source point on the radome, and $\hat{n}$ represents a unit normal vector of the split facet on which the source point of the radome is located.

The method further includes the step of obtaining an electric field vector $E_{o2}$ and a magnetic field vector $H_{o2}$ of the secondary transmission field based on the calculation of the electric field vector $E_{o1}$ and the magnetic field vector $H_{o1}$ of the primary transmission field again. This step can effectively evaluate an electromagnetic response characteristic of a dielectric radome and a metamaterial radome that has microstructure stacks, with respect to an electromagnetic wave, and the calculation accuracy is greatly improved; which compensates for the shortcoming that the electromagnetic response characteristic of the metamaterial radome having microstructure stacks cannot be directly calculated in the prior art.

Next, at the far-field calculation and index extracting stage, the method for evaluating electrical performance includes following steps: calculating far-field information of the antenna by using a Stratton-Chu formula and surface integration based on the primary incident field, a normal vector of the facet of the radome, and the area of the facet; then, calculating a far-field electric field vector $E_i^t$ of the primary transmission field and a far-field electric field vector $E_r^t$ of the secondary transmission field of the "antenna+radome" system, based on the primary and secondary transmission fields and the normal vector of the facet of the radome and the area of the facet, by using the Stratton-Chu formula and surface integration; that is, a direct lobe $E_i^t$ and a reflection lobe $E_r^t$ are respectively obtained.

The method further includes the step of calculating the far-field electric field vectors $E_i^t$ and $E_r^t$, based on the Stratton-Chu formula and surface integration, by using the following formulas:

$$E_i^t = \frac{-jk}{4\pi} \frac{e^{-jk\rho}}{\rho} \hat{r} \times \int_s \left[ (\hat{n} \times E_{o1}) - \sqrt{\frac{\mu}{\varepsilon}} \hat{r} \times (\hat{n} \times H_{o1}) \right] e^{-jkr'} ds, \text{ and}$$

$$E_r^t = \frac{-jk}{4\pi} \frac{e^{-jk\rho}}{\rho} \hat{r} \times \int_s \left[ (\hat{n} \times E_{o2}) - \sqrt{\frac{\mu}{\varepsilon}} \hat{r} \times (\hat{n} \times H_{o2}) \right] e^{-jkr'} ds.$$

The method further includes the following steps: performing vector superposition operation on the direct lobe and the reflection lobe, so as to obtain far-field information $E^t$ of the "antenna+radome" system, that is, $E^t = E_i^t + E_r^t$; performing corresponding index calculation on far-field parameter information based on the far-field information of the antenna, so as to obtain electrical performance parameters associated with the radome. The electrical performance parameters include but are not limited to power transmission efficiency, a sidelobe elevation parameter, a sidelobe elevation parameter of a far-zone RMS, 3 dB beamwidth, and consistency of amplitude and phase.

In an embodiment, the method for evaluating electrical performance of a radome includes the following steps: calculating electric field information of antenna aperture surface according to actually measured electric field information of near-zone radiation of the antenna; splitting the inner wall of the radome, so as to obtain the split facet information of the radome; obtaining far-field information of the "antenna+radome" system based on the electric field information of the aperture surface and the split facet information; and calculating performance parameter information of the radome based on the far-field information of the "antenna+radome" system.

According to an embodiment, a device for evaluating electrical performance of a radome is further provided. The device for evaluating electrical performance of a radome is configured to perform the method for evaluating electrical performance of a radome in the above-mentioned embodiment.

Figure 6:
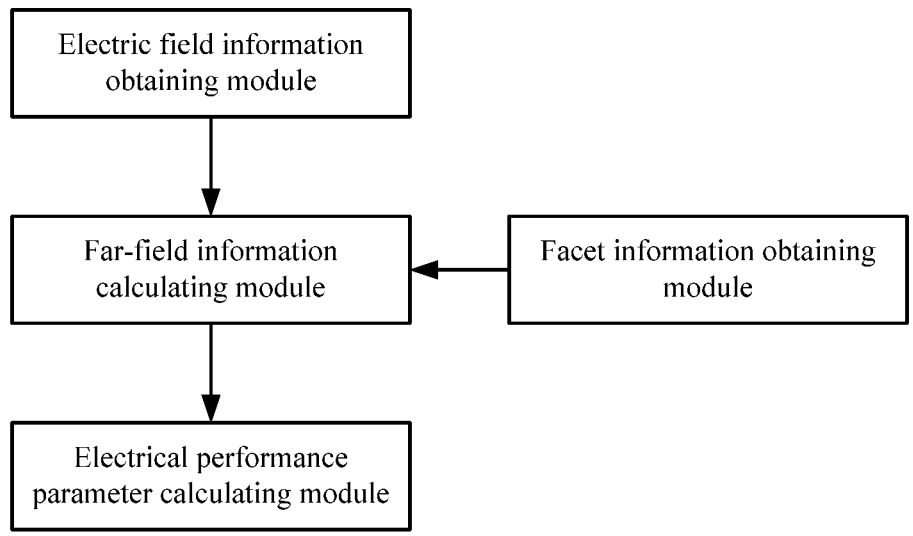
FIG. 6 is a block diagram of Embodiment 1 of a device for evaluating electrical performance of a radome according to the present invention.

As shown in FIG. 6, the radome and an antenna disposed in the radome form an antenna system. The device for evaluating electrical performance specifically includes: an electric field information obtaining module, configured to obtain near-field electric field information of the antenna according to the measurement, and calculate electric field information of the antenna aperture surface according to the near-field electric field information; a facet information obtaining module, configured to obtain model data information of the radome, and obtain the split facet information of the radome according to the model data information of the radome; a far-field information calculating module, connected to the electric field information obtaining module and the facet information obtaining module, and configured to calculate the far-field information of the antenna and the far-field information of the antenna system according to the electric field information of the antenna aperture surface and the split facet information of the radome; and an electrical performance parameter calculating module, connected to the far-field information calculating module, and configured to calculate the electrical performance parameter information of the radome according to the far-field information of the antenna and the far-field information of the antenna system.

In an embodiment, the electric field information obtaining module includes:

a conversion module, configured to perform near-field to far-field transformation on the electric field information of the antenna aperture surface, to obtain a calculated value of the far-field information corresponding to the electric field information of the antenna aperture surface; and a verification module, configured to compare a measured value of the far-field information of the antenna aperture surface obtained according to the actual measurement and the calculated value of the far-field information, to verify the electric field information of the antenna aperture surface.

In an embodiment, the verification module includes:

a comparison submodule, configured to compare the calculated value of the far-field information of the antenna and the measured value of the far-field information; and a processing submodule; wherein the processing submodule is configured to determine the electric field information of the antenna aperture surface as the actual electric field information of the antenna aperture surface, if a difference between the calculated value of the far-field information and the measured value of the far-field information does not exceed a predetermined threshold; or the processing submodule is configured to adjust a test parameter of the near-field electric field information of the antenna and the electric field information obtaining module is configured to obtain near-field electric field information of the antenna according to the measurement and calculate electric field information of the antenna aperture surface according to the near-field electric field information, if the difference exceeds the predetermined threshold.

In an embodiment, the facet information obtaining module includes:

a preprocessing submodule, configured to perform digital model preprocessing on the model data information of the radome, to obtain simplified model data information of the radome; wherein the simplified model data information of the radome determines a center of the antenna aperture surface as an origin of a plane coordinate system, and the antenna aperture surface and the plane coordinate system are located on the same plane; and a split facet information extracting submodule, configured to perform discrete splitting and extracting on the simplified model data information of the radome, to obtain the split facet information of the radome.

In a preferred embodiment, the split facet information of the radome includes center point coordinate (x, y, z) of a split facet, a normal vector $\hat{n}_c$ of the split facet, and an area ds of the split facet.

In a preferred embodiment, the far-field information calculating module includes:

an incident field calculating submodule, configured to calculate, according to the electric field information of the antenna aperture surface and the split facet information of the radome, incident field information radiated by the antenna to the radome, wherein incident field information of an inner surface of the radome includes an electric field vector $E_{i1}$ and a magnetic field vector $H_{i1}$ of an incident field at the field point that is located on the $i^{th}$ split facet, and perform calculating operation according to the following formulas:

$$E_{i1} = -\frac{1}{4\pi}\int_s (E_a \times \hat{n}_a) \times \hat{\rho}\left(jk + \frac{1}{\rho}\right)\frac{e^{-jk\rho}}{\rho}ds, \text{ and}$$

$$H_{i1} = \frac{1}{j4\pi\omega\mu}\int_s \left[-(E_a \times \hat{n}_a)\frac{1}{\rho}\left(jk+\frac{1}{\rho}\right)+k^2(E_a\times\hat{n}_a)\right]\frac{e^{-jk\rho}}{\rho}ds' +$$

$$\frac{1}{j4\pi\omega\mu}\int_s [(E_a\times\hat{n}_a)\cdot\hat{\rho}]\hat{\rho}\left(-k^2+\frac{3jk}{\rho}+\frac{3}{\rho^2}\right)\frac{e^{-jk\rho}}{\rho}ds'.$$

Wherein $\lambda_0$ represents a free-space wavelength, $k=2\pi/\lambda_0$ represents a free-space wavenumber, $\varepsilon$ represents the permittivity, $\mu$ represents the permeability; $\omega=2\pi f$ represents an angular frequency, $f$ represents an operating frequency of the antenna, $\rho=|r-r'|$ represents a distance from a source point to a field point on the radome, $$\hat{\rho} = \frac{r-r'}{|r-r'|}$$

represents a unit vector of $\rho$, r is a position vector of the field point on the radome, r' is a position vector of the source point on the antenna aperture, $\hat{n}_a$ is a unit normal vector of the antenna aperture surface, and the electric field information of the antenna aperture surface includes an electric field $E_a$ excited by the antenna aperture.

In a preferred embodiment, the far-field information calculating module further includes:

a scattering parameter obtaining submodule, configured to obtain scattering parameter information of the radome;

a transmission field information calculating submodule, configured to calculate transmission field information of the radome according to the scattering parameter information of the radome and the incident field information radiated by the antenna to the radome, where the transmission field information includes an electric field vector $E_{o1}$ and a magnetic field vector $H_{o1}$ of a primary transmission field, an electric field vector $E_{o2}$ and a magnetic field vector $H_{o2}$ of a secondary transmission field; and an antenna system far-field calculating submodule, configured to calculate the far-field information $E^t(\theta, \phi)$ of the antenna system, according to the transmission field information of the radome and the split facet of the radome, by using the following formulas:

$$E_i^t(\theta,\phi) = \frac{-jk}{4\pi}\frac{e^{-jkr}}{r}\hat{r}\times\int_s\left[(\hat{n}\times E_{o1}(r))-\sqrt{\frac{\mu}{\varepsilon}}\hat{r}\times(\hat{n}\times H_{o1}(r))\right]e^{-jkr'}ds,$$

$$E_r^t(\theta,\phi) =$$

$$\frac{-jk}{4\pi}\frac{e^{-jkr}}{r}\hat{r}\times\int_s\left[(\hat{n}\times E_{o2}(r))-\sqrt{\frac{\mu}{\varepsilon}}\hat{r}\times(\hat{n}\times H_{o2}(r))\right]e^{-jkr'}ds, \text{ and}$$

$$E^t(\theta,\phi) = E_i^t(\theta,\phi) + E_r^t(\theta,\phi).$$

In an embodiment, the transmission field information calculating submodule includes:

a polarizational decomposition unit, configured to perform, according to an incident surface $\hat{n}_c\times\hat{k}_{i1}$ defined by the normal vector $\hat{n}_c$ of the split facet and a propagating direction vector $\hat{k}_{i1}$ of an incident wave and a unit vector $\hat{e}_{i1}$ of an incident electric field in a polarization direction, polarizational decomposition on a horizontal direction vector $\hat{e}_\parallel$ and a vertical direction vector $\hat{e}_\perp$ of an incident electromagnetic field along the incident surface, and calculate a vertical polarization wave component $E_{i1}^\perp$ and a horizontal polarization wave component $\mathbf{E}_{i1}^\parallel$ respectively by using the following formulas:

$$E_{i1}^\perp = (E_{i1}\cdot\hat{e}_\perp)\hat{e}_\perp, \quad \mathbf{E}_{i1}^\parallel = (E_{i1}\cdot\hat{e}_\parallel)\hat{e}_\parallel, \text{ and}$$

$$H_{i1}^\perp = (H_{i1}\cdot\hat{e}_\perp)\hat{e}_\perp, \quad \mathbf{H}_{i1}^\parallel = (H_{i1}\cdot\hat{e}_\parallel)\hat{e}_\parallel,$$

$$\hat{e}_\perp = \hat{e}_{i1}\cdot(\hat{n}_c\times\hat{k}_{i1}), \text{ and } \hat{\mathbf{e}}_\parallel = \hat{e}_\perp\times\hat{k}_{i1}.$$

Wherein the scattering parameter information includes an amplitude $S11^\perp$ and a phase $\phi_{11}^\perp$ of a vertical polarization wave reflecting coefficient $S11$, an amplitude $S11^\parallel$ and a phase $\phi_{11}^\parallel$ of a horizontal polarization wave reflecting coefficient $S11'$; an amplitude $S21^\perp$ and a phase $\phi_{21}^\perp$ of a vertical polarization wave transmitting coefficient $S21$, an amplitude $S21^\parallel$ and a phase $\phi_{21}^\parallel$ of a horizontal polarization wave transmitting coefficient $S21'$; and a transmission field information calculating unit, configured to: calculate a vertical component $E_{o1}^\perp$ and a horizontal component $E_{o1}^\parallel$ of the electric field vector of the primary an transmission field, a vertical component $H_{o1}^\perp$ and a horizontal component $H_{o1}^\parallel$ of the magnetic field vector of the primary transmission field, according to propagation characteristics of a plane electromagnetic field and the scattering parameter information, by using the following formulas:

$$\begin{cases} E_{o1}^\perp = E_{i1}^\perp S21^\perp e^{j\left(\phi_{21}^\perp - \frac{2\pi d}{\lambda}\cos\theta_{i1}\right)}, & E_{o1}^\parallel = E_{i1}^\parallel S21^\parallel e^{j\left(\phi_{21}^\parallel - \frac{2\pi d}{\lambda}\cos\theta_{i1}\right)} \\ H_{o1}^\perp = H_{i1}^\perp S21^\parallel e^{j\left(\phi_{21}^\parallel - \frac{2\pi d}{\lambda}\cos\theta_{i1}\right)}, & H_{o1}^\parallel = H_{i1}^\parallel S21^\perp e^{j\left(\phi_{21}^\perp - \frac{2\pi d}{\lambda}\cos\theta_{i1}\right)} \end{cases};$$

where the incident field information includes an incident angle $\theta_{i1}$;

obtain the electric field vector $E_{o1}$ of the primary transmission field according to the component $E_{o1}^\perp$ and the horizontal component $E_{o1}^\parallel$ of the electric field vector of the primary transmission field, and obtain the magnetic field vector $H_{o1}$ of the primary transmission field according to the vertical component $H_{o1}^\perp$ and the horizontal component $H_{o1}^\parallel$ of the magnetic field vector of the primary transmission field;

calculate an electric field vector $E^r$ and a magnetic field vector $H^r$ of the primary reflection field by using the following formulas:

$$\begin{cases} E^r = E_{i1}^\perp S11^\perp e^{j\phi_{11}^\perp} + \left(E_{o1}^\square \times \hat{k}_r\right)S11^\square e^{j\phi_{11}^\square} \\ H^r = H_{i1}^\perp S11^\square e^{j\phi_{11}^\square} + \left(H_{i1}^\square \times \hat{k}_r\right)S11^\perp e^{j\phi_{11}^\perp} \end{cases},$$

and $\hat{k}_r = \hat{k}_{i1} - 2(\hat{n}_c \square \hat{k}_{i1})\hat{n}_c$; wherein $\hat{k}_r$ represents a reflection direction vector of an incident wave; and calculate an electric field vector $E_{i2}$ and a magnetic field vector $H_{i2}$ of the secondary incident field by using the following formulas:

$$E_{i2} = \frac{1}{j4\pi\omega\varepsilon}\int_s \left[-(\hat{n} \times H^r)\frac{1}{\rho}\right.$$
$$\left(jk + \frac{1}{\rho}\right) + [(\hat{n} \times H^r)\overline{\hat{\rho}}]\hat{\rho}\left(-k^2 + \frac{3jk}{\rho} + \frac{3}{\rho^2}\right) + k^2(\hat{n} \times H^r)\right]$$
$$\frac{e^{-jk\rho}}{\rho}ds' - \frac{1}{4\pi}\int_s (E^r \times \hat{n}) \times \hat{\rho}\left(jk + \frac{1}{\rho}\right)\frac{e^{-jk\rho}}{\rho}ds',$$

and $$H_{i2} = \frac{1}{j4\pi\omega\mu}\int_s \left[-(E^r \times \hat{n})\frac{1}{\rho}\left(jk + \frac{1}{\rho}\right) + [(E^r \times \hat{n})\overline{\hat{\rho}}]\hat{\rho}\left(-k^2 + \frac{3jk}{\rho} + \frac{3}{\rho^2}\right) + \right.$$
$$k^2(E^r \times \hat{n})\left]\frac{e^{-jk\rho}}{\rho}ds' + \frac{1}{4\pi}\int_s (\hat{n} \times H^r) \times \hat{\rho}\left(jk + \frac{1}{\rho}\right)\frac{e^{-jk\rho}}{\rho}ds'.$$

In an embodiment, the scattering parameter obtaining submodule includes:

a full-wave simulation unit, configured to perform full-wave simulation on the radome to obtain the scattering parameter information of the radome.

In an embodiment, the preprocessing submodule includes a simplification processing unit, a translation processing unit, and a rotation processing unit; and the simplification processing unit, the translation processing unit, and the rotation processing unit are respectively configured to perform simplification processing, translation processing, and rotation processing on the model data information of the radome.

In an embodiment, the electrical performance parameter information includes at least one of the following: power transmission efficiency, a side lobe elevation parameter, a side lobe elevation parameter of a far-zone RMS, 3 dB beamwidth, and consistency of amplitude and phase.

In summary, according to the above technical solutions of the present invention, the electric field information of the antenna aperture surface is obtained by using the actually measured electric field information of near-zone radiation of the antenna, and then the performance parameter information of the radome is obtained. In this way, calculation accuracy is ensured without relying on digital model input of the antenna, operability of evaluating electrical performance of the radome is greatly enhanced, and the calculation accuracy is effectively improved.

Embodiment 2

According to another embodiment of the present invention, a method for evaluating electrical performance of a radome is also provided.

Figure 7:
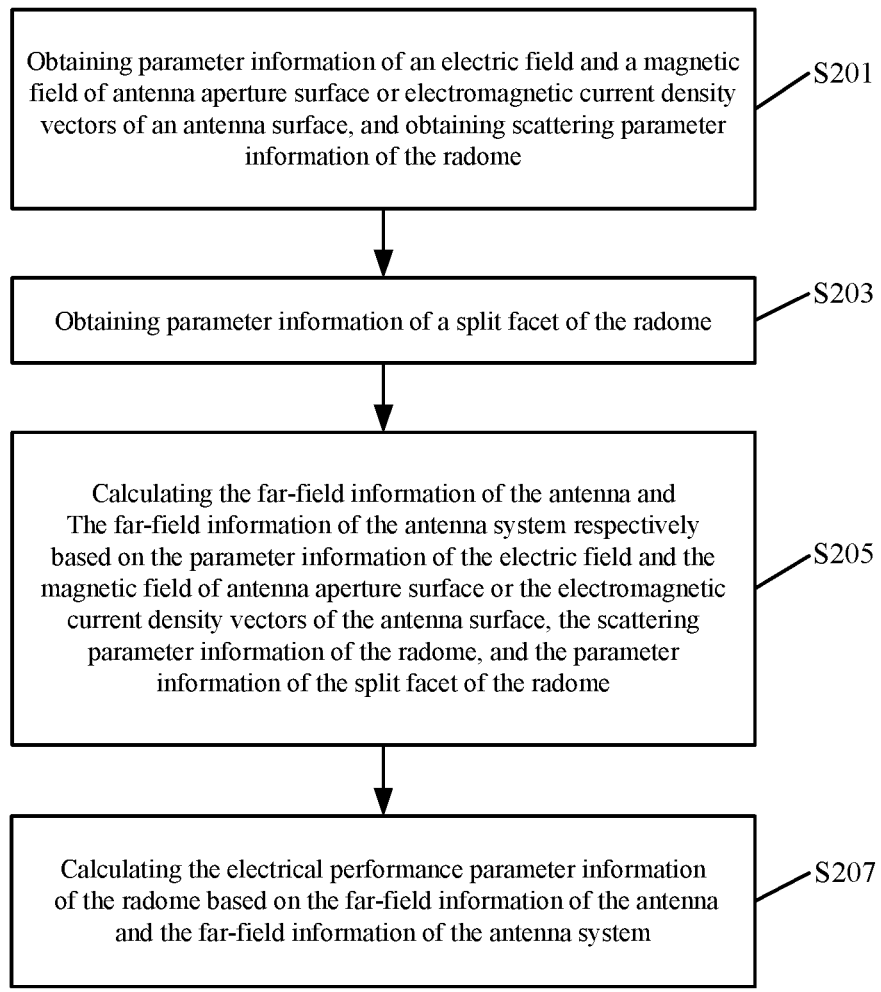
FIG. 7 is a flowchart of Embodiment 2 of a method for evaluating electrical performance of a radome according to the present invention.

As shown in FIG. 7, the method for evaluating electrical performance of a radome according to this embodiment of the present invention specifically includes the following steps:

Step S201. obtaining parameter information of an electric field and a magnetic field on the antenna aperture surface or electromagnetic current density vectors of an antenna surface, and obtaining scattering parameter information of the radome.

Step S203. obtaining parameter information of a split facet of the radome.

Step S205. calculating the far-field information of the antenna and the far-field information of the antenna system respectively based on the parameter information of the electric field and the magnetic field on the antenna aperture surface or the electromagnetic current density vectors of the antenna surface, the scattering parameter information of the radome, and the parameter information of the split facet of the radome.

Step S207. calculating the electrical performance parameter information of the radome based on the far-field information of the antenna and the far-field information of the antenna system.

The radome may be a dielectric radome, or may be a metamaterial radome having microstructure stacks.

The above solutions of the present invention can implement electrical performance evaluation of the dielectric radome or the metamaterial radome having microstructure stacks, and greatly improve calculation accuracy and calculation rate of electrical performance evaluation.

Figure 8:
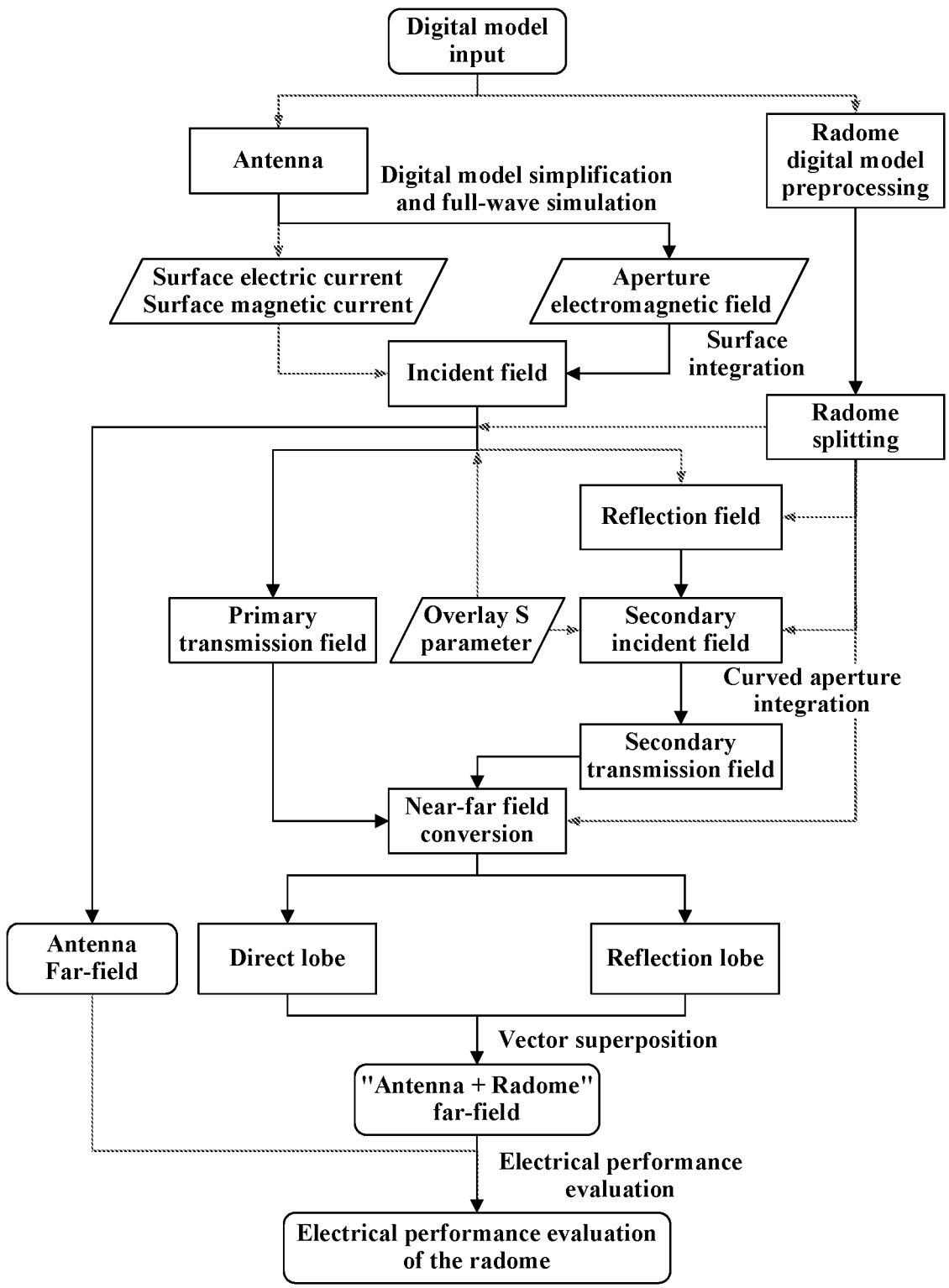
FIG. 8 is an embodiment flowchart of Embodiment 2 of the method for evaluating electrical performance of a radome according to the present invention.
Figure 9:
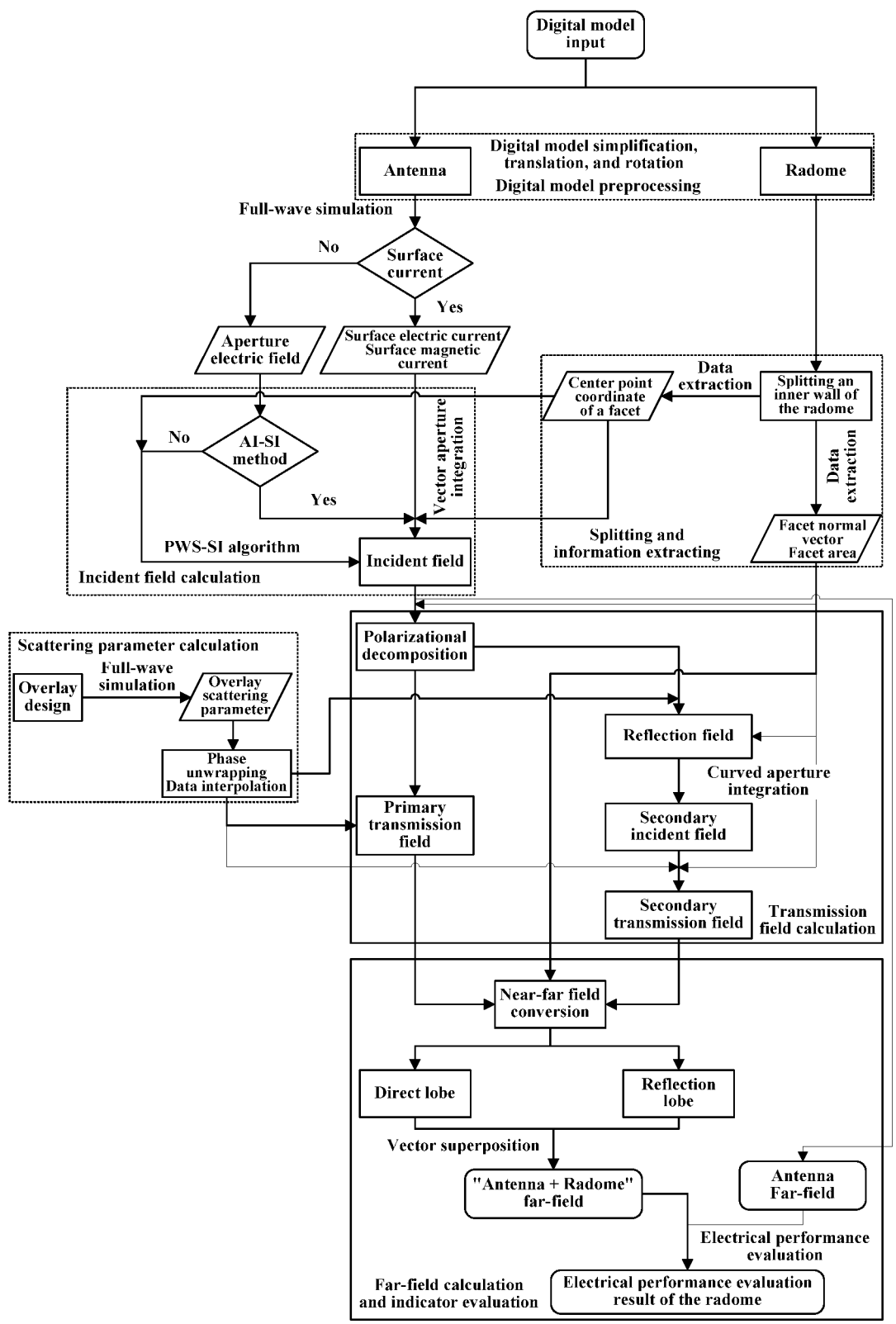
FIG. 9 is a specific embodiment flowchart of Embodiment 2 of the method for evaluating electrical performance of a radome according to the present invention.

FIG. 8 and FIG. 9 show specific embodiments of the method for evaluating electrical performance of a radome according to the present invention. The following section describes in detail the method for evaluating electrical performance according to the present invention according to FIG. 8 and FIG. 9. In FIG. 8 and FIG. 9:

Firstly, obtaining digital model input (model data information) of the antenna and the radome. The model data information includes related information for representing operating status of the antenna and the radome, such as model parameters of the antenna and the radome, relative position information, the feeding form of the antenna, and the operating frequency range of the antenna.

As shown in FIG. 8 and FIG. 9, the method for evaluating electrical performance enters a digital model preprocessing stage. Digital model preprocessing is to perform simplification, translation, rotation processing or the like on models of the antenna and the radome, such that the simplified model uses a center of the antenna aperture surface as an origin of the coordinate system, and a plane of the aperture surface is located on a plane of the coordinate axis. The simplification processing is to simplify the complex model. For example, the model data information of the antenna includes complex models such as a fastening screw, a mounting interface, and a supporting structure. The simplification processing is to remove these complex models to obtain a simple model, so as to facilitate electromagnetic simulation.

Referring to FIG. 8 and FIG. 9, after the digital model preprocessing stage, the method for evaluating electrical performance further includes splitting and information extracting stage, which is mainly intended for model data parameter information of the radome. At this stage, the method includes steps of discretely splitting the pre-processed inner wall of the radome to obtain a plurality of corresponding discrete facets of the radome. The position of the discrete point can be represented by the center point coordinate (x, y, z) of the facet. The split facet information includes the center point coordinate (x, y, z) of the split facet, a normal vector $\hat{n}_c$ of the split facet, and vertex coordinate of the split facet or an area ds of the split facet.

Referring to FIG. 8 and FIG. 9 again, the method for evaluating electrical performance enters an incident field calculating stage. At this stage, the method includes the following steps: performing full-wave simulation on the antenna model after digital model preprocessing, obtaining electric field information $E_a$ and magnetic field information $H_a$ of the antenna aperture surface (where the electric field information $E_a$ of the antenna aperture surface includes $E_a(x_0,y_0,z_0)$ and the magnetic field information $H_a$ of the antenna aperture surface includes H) or an electric current density vector J and a magnetic current density vector M of the antenna surface (where the electric current density vector J includes $J(x_0,y_0,z_0)$ and the magnetic current density vector M includes $M(x_0,y_0,z_0)$ from the results of the full-wave simulation, where $(x_0,y_0,z_0)$ is the coordinate of the source point on the antenna aperture. Then, different algorithms are selected according to information extracted from antenna simulation and facet subdivision, to calculate incident field information radiated by the antenna to the inner wall of the radome. The incident field information includes an electric field vector $E_{i1}$ and a magnetic field vector $H_{i1}$ of the incident field at the field point that is located on the $i^{th}$ split facet, a propagating direction vector $\hat{k}_{i1}$ of an incident wave, an incident angle $\theta_{i1}$, and an electric field polarization angle $\beta_{i1}$, where i is an integer greater than 1.

Specifically, there are three methods for calculating the electric field vector $E_{i1}$ and the magnetic field vector $H_{i1}$ of the incident field at the above field point: A first calculation method is an aperture integration-surface integration algorithm (AI-SI algorithm) calculated according to the electric field and the magnetic field on the aperture surface and the center point coordinate of the split facet. A second calculation method is a plane wave spectrum-surface integration algorithm (PWS-SI algorithm) calculated according to the electric field and the magnetic field on the aperture surface and the center point coordinate of the split facet. A third calculation method is a vector aperture integration algorithm calculated according to the electric current density vector and magnetic current density vector of the antenna and the center point coordinate of the split facet.

Preferably, the method further includes the step of calculating the electric field vector $E_{i1}$ and the magnetic field vector $H_{i1}$ of the incident field respectively, based on the electric current density vector J, the magnetic current density vector M, and the area ds of the split facet of the radome, by using the vector aperture integration algorithm and using the following formulas:

$$E_{i1} = \frac{1}{j4\pi\omega\varepsilon}\int_s\left[-J\frac{1}{\rho}\left(jk+\frac{1}{\rho}\right)+(\mathbf{J}\cdot\hat{\rho})\hat{\rho}\left(-k^2+\frac{3jk}{\rho}+\frac{3}{\rho^2}\right)+k^2J\right]\frac{e^{-jk\rho}}{\rho}ds -$$

$$\frac{1}{4\pi}\int_s M\times\hat{\rho}\left(jk+\frac{1}{\rho}\right)\frac{e^{-jk\rho}}{\rho}ds, \text{ and}$$

$$H_{i1} = \frac{1}{j4\pi\omega\mu}\int_s\left[-M\frac{1}{\rho}\left(jk+\frac{1}{\rho}\right)+(\mathbf{M}\cdot\hat{\rho})\hat{\rho}\left(-k^2+\frac{3jk}{\rho}+\frac{3}{\rho^2}\right)+k^2M\right]$$

$$\frac{e^{-jk\rho}}{\rho}ds + \frac{1}{4\pi}\int_s J\times\hat{\rho}\left(jk+\frac{1}{\rho}\right)\frac{e^{-jk\rho}}{\rho}ds.$$

Wherein $\lambda_0$ represents a free-space wavelength, $k=2\pi/\lambda_0$ represents a free-space wavenumber, $\varepsilon$ represents the permittivity, $\mu$ represents the permeability, $\omega=2\pi f$ represents an angular frequency, $f$ represents an operating frequency of the antenna, $\rho=|r-r'|$ represents a distance from a source point to a field point on the radome, $$\hat{\rho}=\frac{r-r'}{|r-r'|}$$

represents a unit vector of $\rho$, r is a position vector of the field point on the radome, r' is a position vector of the source point on the antenna aperture; J is the electric current density vector of the antenna surface, and M is the magnetic current density vector of the antenna surface.

Optionally, the method further includes the step of calculating the electric field vector $E_{i1}$ and the magnetic field vector $H_{i1}$ of the incident field, based on the AI-SI algorithm, by using the following formulas:

$$E_{i1} = -\frac{1}{4\pi}\int_s(E_a\times\hat{n}_a)\times\hat{\rho}\left(jk+\frac{1}{\rho}\right)\frac{e^{-jk\rho}}{\rho}ds, \text{ and}$$

$$H_{i1} = \frac{1}{j4\pi\omega\mu}\int_s\left[-(E_a\times\hat{n}_a)\frac{1}{\rho}\left(jk+\frac{1}{\rho}\right)+k^2(E_a\times\hat{n}_a)\right]\frac{e^{-jk\rho}}{\rho}ds' +$$

$$\frac{1}{j4\pi\omega\mu}\int_s[(E_a\times\hat{n}_a)\cdot\hat{\rho}]\hat{\rho}\left(-k^2+\frac{3jk}{\rho}+\frac{3}{\rho^2}\right)\frac{e^{-jk\rho}}{\rho}ds'.$$

Wherein $\hat{n}_a$ is a unit normal vector of the antenna aperture surface.

Optionally, the method further includes the step of calculating the electric field vector $E_{i1}$ of the incident field, based on the PWS-SI algorithm, by using the following formulas:

$$E_{i1} = \frac{1}{2\pi}\int\int\Omega(k_x,k_y)e^{-j(k_xx+k_yy+k_zz)}dk_xdk_y, \text{ and}$$

$$\Omega(k_x,k_y) = \frac{1}{2\pi}\int\int E^t(x_0,y_0,z_0)e^{-j(k_xx+k_yy)}dxdy.$$

Wherein $(x_0,y_0,z_0)$ is the coordinate of a source point on the antenna aperture, $(x,y,z)$ is the coordinate of a field point on the radome, $E^t(x_0,y_0,z_0)$ is a tangential component of $E_a$ in the electric field information $E_a(x_0,y_0,z_0)$ of the antenna aperture surface, $k_x$ represents an x-axis component of a free-space vector wavenumber in a three-dimensional cartesian coordinate system, and $k_y$ represents a y-axis component of the free-space vector wavenumber in the three-dimensional cartesian coordinate system.

Further, the method further includes the step of calculating the propagating direction vector $\hat{k}_{i1}$ of the incident wave, the incident angle $\theta_{i1}$, and the electric field polarization angle $\beta_{i1}$ respectively by using the following formulas:

$$\hat{k}_{i1} = \text{Re}(E_{i1}\times H_{i1}^*)/|\text{Re}(E_{i1}\times H_{i1}^*)|,$$

$$\theta_{i1} = \arccos\left(\frac{\hat{n}_c\cdot\hat{k}_{i1}}{|\hat{n}_c\cdot\hat{k}_{i1}|}\right), \text{ and}$$

$$\beta_{i1} = \arcsin\left[\frac{(\hat{k}_{i1}\times\hat{n}_c)\cdot\hat{e}_{i1}}{|(\hat{k}_{i1}\times\hat{n}_c)\cdot\hat{e}_{i1}|}\right].$$

Wherein $\hat{e}_{i1}$ is a unit vector of the incident electric field in a polarization direction, Re represents the real part, and $H^*_{i1}$ is a conjugate number of $H_{i1}$.

Referring to FIG. 8 and FIG. 9 again, the method for evaluating electrical performance further includes the stage for calculating scattering parameters of stacked layers of the radome. This mainly means that the radome is approximate to the form of a combination of periodic stacked layers. The method includes the following steps: performing full-wave simulation on a single periodic stacked layer combined with periodic boundaries, so as to obtain scattering parameters of the plane waves that are respectively parallel and perpendicular to the incident surface at different frequency points and different incident angles; according to the frequency point that needs to be calculated for evaluating the electrical performance, performing interpolation operation of a frequency dimension on the obtained scattering parameter information at each incident angle; then, extracting the scattering parameter information at the calculated frequency point that varies according to the incident angle, and unwrapping the phase information in the scattering parameter, that is, a periodic extension operation is performed on the phase; then, performing interpolation processing in the dimension of the incident angle, based on the incident angle calculated at the incident field calculating stage, on the scattering parameter at the calculated frequency point that varies according to the incident angle, so as to obtain scattering parameter information at the calculated frequency point and at the incident angle corresponding to a center point of each split facet on the inner wall of the radome. The scattering parameter information includes an amplitude $S11^\perp$ and a phase $\phi_{11}^\perp$ of a vertical polarization wave reflecting coefficient $S11$, an amplitude $S11^{\parallel}$ and a phase $\phi_{11}^{\square}$ of a horizontal polarization wave reflecting coefficient $S11'$; an amplitude $S21^\perp$ and a phase $\phi_{21}^\perp$ of a vertical polarization wave transmitting coefficient $S21$, a amplitude $S21^{\square}$ and a phase $\phi_{21}^{\square}$ of a horizontal polarization wave transmitting coefficient $S21'$.

Referring to FIG. 8 and FIG. 9 again, the method for evaluating electrical performance further includes a transmission electromagnetic field calculating stage. At this stage, the method further includes the step of performing, based on an incident surface $\hat{n}_c \times \hat{k}_{i1}$ defined by the normal vector $\hat{n}_c$ of the split facet and the propagating direction vector $\hat{k}_{i1}$ of the incident wave and the unit vector $\hat{e}_{i1}$ of the incident electric field in the polarization direction, polarizational decomposition on a horizontal direction vector $\hat{e}_{\parallel}$ and a vertical direction vector $\hat{e}_\perp$ of an incident electromagnetic field along the incident surface, so as to obtain two orthogonal components, that is, a vertical polarization wave component $E_{i1}^\perp$ and a horizontal polarization wave component $E_{i1}^{\square}$, where $\hat{e}_\perp = \hat{e}_{i1} \sqsubset \hat{n}_c \times \hat{k}_{i1})$ and $\hat{e}_{\square} = \hat{e}_\perp \times \hat{k}_{i1}$, and $E_{i1}^\perp = (E_{i1} \cdot \hat{e}_\perp)\hat{e}_\perp$, $\mathbf{E}_{i1}^{\square} = (E_{i1} \cdot \hat{e}_{\square})\hat{e}_{\square}$, and $H_{i1}^\perp = (H_{i1} \cdot \hat{e}_\perp)\hat{e}_\perp$, $\mathbf{H}_{i1}^{\square} = (H_{i1} \cdot \hat{e}_{\square})\hat{e}_{\square}$.

The method further includes the following steps: performing an operation on orthogonal polarization waves and the scattering parameter information according to propagation characteristics of an electromagnetic wave, and performing vector superposition operation; calculating a vertical component $E_{o1}^\perp$ and a horizontal component $E_{o1}^{\parallel}$ of an electric field vector of the primary transmission field, a vertical component $H_{o1}^\perp$ and a horizontal component $H_{o1}^{\parallel}$ of a magnetic field vector of the primary transmission field; an electric field vector $E^r$ and a magnetic field vector $H^r$ of the primary reflection field respectively by using the following formulas:

$$\begin{cases} E_{o1}^\perp = E_{i1}^\perp S21^\perp e^{j(\phi_{21}^\perp - \frac{2\pi d}{\lambda}\cos\theta_{i1})}, E_{o1}^{\square} = E_{i1}^{\square} S21^{\square} e^{j(\phi_{21}^{\square} - \frac{2\pi d}{\lambda}\cos\theta_{i1})} \\ H_{o1}^\perp = H_{i1}^{\square} S21^{\square} e^{j(\phi_{21}^{\square} - \frac{2\pi d}{\lambda}\cos\theta_{i1})}, H_{o1}^{\square} = H_{i1}^{\square} S21^\perp e^{j(\phi_{21}^\perp - \frac{2\pi d}{\lambda}\cos\theta_{i1})} \end{cases};$$

$$\begin{cases} E^r = E_{i1}^\perp S11^\perp e^{j\phi_{11}^\perp} + (E_{o1}^{\square} \times \hat{k}_r) S11^{\square} e^{j\phi_{11}^{\square}}, \\ H^r = H_{i1}^{\square} S11^{\square} e^{j\phi_{11}^{\square}} + (H_{i1}^{\square} \times \hat{k}_r) S11^\perp e^{j\phi_{11}^\perp}, \end{cases}$$

Wherein $\hat{k}_r$ represents a propagating direction vector of the incident wave. Furthermore, the method further includes the following steps: obtaining the electric field vector $E_{o1}$ of the primary transmission field based on the vertical component $E_{o1}^\perp$ and the horizontal component $E_{o1}^{\parallel}$ of the electric field vector of the primary transmission field, and obtaining the magnetic field vector $H_{o1}$ of the primary transmission field based on the vertical component $H_{o1}^\perp$ of and the horizontal component $H_{o1}^{\parallel}$ of the magnetic field vector of the primary transmission field.

The method further includes the step of calculating a reflection propagating field of each field point relative to a reflection field, based on the determination of the inner surface of the radome as an integral field point, by using a curved aperture integral method, so as to obtain an electric field vector $E_{i2}$ and a magnetic field vector $H_{i2}$ of the secondary incident field at the field point on the antenna. Calculation formulas related to the curved aperture integral method are as follows:

$$E_{i2} = \frac{1}{j4\pi\omega\varepsilon}\int_s \left[-(\hat{n}\times H^r)\frac{1}{\rho}\right.$$
$$\left(jk+\frac{1}{\rho}\right) + [(\hat{n}\times H^r)\overline{\mathbf{p}}]\hat{\rho}\left(-k^2+\frac{3jk}{\rho}+\frac{3}{\rho^2}\right) + k^2(\hat{n}\times H^r)\right]$$
$$\frac{e^{-jk\rho}}{\rho}ds' - \frac{1}{4\pi}\int_s (E^r\times\hat{n})\times\hat{\rho}\left(jk+\frac{1}{\rho}\right)\frac{e^{-jk\rho}}{\rho}ds',$$

and $$H_{i2} = \frac{1}{j4\pi\omega\mu}\int_s \left[-(E^r\times\hat{n})\frac{1}{\rho}\left(jk+\frac{1}{\rho}\right) + [(E^r\times\hat{n})\overline{\mathbf{p}}]\hat{\rho}\left(-k^2+\frac{3jk}{\rho}+\frac{3}{\rho^2}\right) + \right.$$
$$\left. k^2(E^r\times\hat{n})\right]\frac{e^{-jk\rho}}{\rho}ds' + \frac{1}{4\pi}\int_s (\hat{n}\times H^r)\times\hat{\rho}\left(jk+\frac{1}{\rho}\right)\frac{e^{-jk\rho}}{\rho}ds'.$$

In the above formulas, $k=2\pi/\lambda_0$ represents a free-space wavenumber, $\lambda_0$ represents a free-space wavelength, $\varepsilon$ represents the permittivity, $\mu$ represents the permeability; $\rho=|r-r'|$ represents a distance from a source point to a field point, $$\hat{\rho} = \frac{r-r'}{|r-r'|}$$

represents a unit vector of $\rho$, r is a position vector of the field point on the radome, r' is a position vector of a source point on the radome, and $\hat{n}$ is a unit normal vector of the split facet on which the source point of the radome is located.

The method further includes the step of obtaining an electric field vector $E_{o2}$ and a magnetic field vector $H_{o2}$ of the secondary transmission field based on the calculation of the electric field vector $E_{o1}$ and the magnetic field vector $H_{o1}$ of the primary transmission field. By using this step, an electromagnetic response characteristic, with respect to an electromagnetic wave, of the dielectric radome and the metamaterial radome that has microstructure stacks can be effectively evaluated, and calculation accuracy is greatly improved. This compensates for the shortcoming that the electromagnetic response characteristic of the metamaterial radome having microstructure stacks cannot be directly calculated in the prior art.

Next, at a far-field calculation and index extracting stage, the method further includes the following steps: calculating far-field information of the antenna, based on the primary incident field, a normal vector of the facet of the radome, and the area of the facet, by using a Stratton-Chu formula and surface integration; then, calculating a far-field electric field vector $E_i^t$ of the primary transmission field and a far-field electric field vector $E_r^t$ of the secondary transmission field of the "antenna+radome" system, based on the primary and secondary transmission fields, the normal vector of the facet of the radome, and the area of the facet, by using the Stratton-Chu formula and surface integration; that is, the direct lobe $E_i^t$ and the reflection lobe $E_r^t$ are respectively obtained.

The method further includes the step of calculating the far-field electric field vectors $E_i^t$ and $E_r^t$, based on the Stratton-Chu formula and surface integration, by using the following formulas:

$$E_i^t = \frac{-jk}{4\pi} \frac{e^{-jk\rho}}{\rho} \hat{r} \times \int_s \left[ (\hat{n} \times E_{o1}) - \sqrt{\frac{\mu}{\varepsilon}} \hat{r} \times (\hat{n} \times H_{o1}) \right] e^{-jkr'} ds, \text{ and}$$

$$E_r^t = \frac{-jk}{4\pi} \frac{e^{-jk\rho}}{\rho} \hat{r} \times \int_s \left[ (\hat{n} \times E_{o2}) - \sqrt{\frac{\mu}{\varepsilon}} \hat{r} \times (\hat{n} \times H_{o2}) \right] e^{-jkr'} ds.$$

Then, the method further includes the following steps: performing vector superposition operation on the direct lobe and the reflection lobe, to obtain far-field information $E^t$ of the "antenna+radome" system, that is, $E^t = E_i^t + E_r^t$; and performing corresponding index calculation on far-field parameter information based on the far-field information of the antenna, so as to obtain electrical performance parameters associated with the radome. The electrical performance parameters include but are not limited to power transmission efficiency, a sidelobe elevation parameter, a sidelobe elevation parameter of a far-zone RMS, 3 dB beamwidth, and consistency of amplitude and phase.

According to an embodiment, a device for evaluating electrical performance of a radome is further provided. The device for evaluating electrical performance is configured to perform the method for evaluating electrical performance of a radome in the above-mentioned embodiment.

Figure 10:
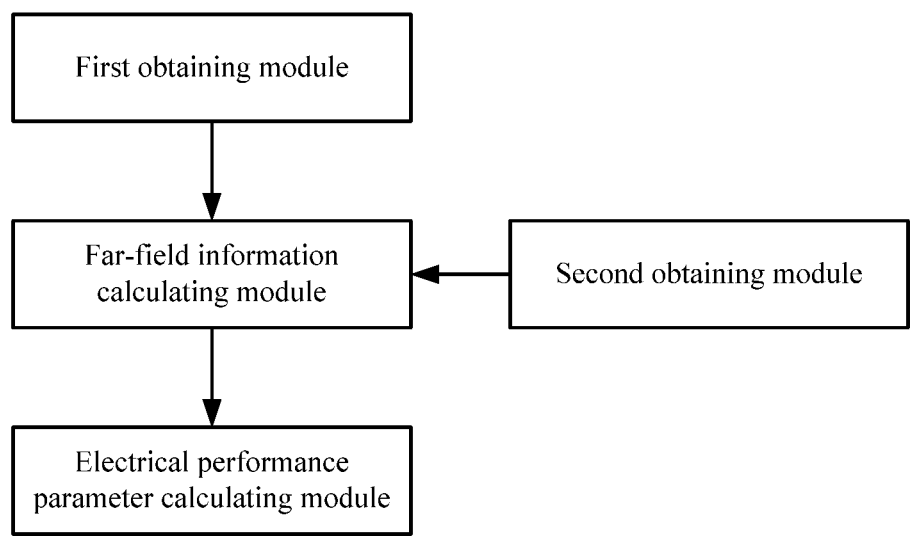
FIG. 10 is a block diagram of Embodiment 2 of a device for evaluating electrical performance of a radome according to the present invention.

As shown in FIG. 10, the device for evaluating electrical performance specifically includes: a first obtaining module, configured to obtain parameter information of an electric field and a magnetic field on the antenna aperture surface or electromagnetic current density vectors of the antenna surface, and obtain scattering parameter information of the radome; a second obtaining module, configured to obtain parameter information of a split facet of the radome; a far-field information calculating module, configured to calculate the far-field information of the antenna and the far-field information of the antenna system respectively based on the parameter information of the electric field and the magnetic field on the antenna aperture surface or the electromagnetic current density vectors of the antenna surface, the scattering parameter information of the radome, and the parameter information of the split facet of the radome; and the electrical performance parameter calculating module, configured to calculate the electrical performance parameter information of the radome based on the far-field information of the antenna and the far-field information of the antenna system.

In an embodiment, the first obtaining module includes: a simulation submodule, configured to generate a radome simulation model based on the radome, wherein each of the radome and the radome simulation model comprises a plurality of microstructure stacks that have the same structure and are arranged in the same manner; the simulation submodule further configured to perform full-wave simulation on the radome simulation model to obtain the scattering parameter information of the radome.

In an embodiment, the second obtaining module includes:
a model obtaining submodule, configured to obtain model data information of the antenna and model data information of the radome;
a preprocessing submodule, configured to perform digital model preprocessing on the model data information of the antenna and the model data information of the radome, to obtain preprocessed data information of the antenna and preprocessed data information of the radome; wherein the preprocessed data information of the antenna and the preprocessed data information of the radome determine a center of the antenna aperture surface as an origin of a coordinate system, and the antenna aperture surface and the coordinate system are located on the same plane;
an electromagnetic information obtaining submodule, configured to obtain the parameter information of the electric field and the magnetic field on the antenna aperture surface or the electromagnetic current density vectors of the antenna surface based on the preprocessed data information of the antenna; and
a scattering parameter obtaining submodule, configured to obtain the scattering parameter information of the radome based on the preprocessed data information of the radome.

In an embodiment, the parameter information of the split facet of the radome includes center point coordinate (x, y, z) of a split facet, a normal vector $\hat{n}_c$ of the split facet, and an area ds of the split facet.

In an embodiment, the far-field information calculating module includes:
an incident field calculating submodule, configured to calculate incident field information of an inner surface of the radome according to the electric current density vector J and the magnetic current density vector M of the surface of the antenna and the parameter information of the split facet of the radome, where the incident field information of the inner surface of the radome includes an electric field vector $E_{i1}$ and a magnetic field vector $H_{i1}$ of an incident field at the field point that is located on the $i^{th}$ split facet of the radome, and perform calculation operation according to the following formulas:

$$E_{i1} = \frac{1}{j4\pi\omega\varepsilon} \int_s \left[ -J\frac{1}{\rho}\left(jk + \frac{1}{\rho}\right) + (J\Box\hat{\rho})\hat{\rho}\left(-k^2 + \frac{3jk}{\rho} + \frac{3}{\rho^2}\right) + k^2 J \right] \frac{e^{-jk\rho}}{\rho} ds - \frac{1}{4\pi} \int_s M \times \hat{\rho}\left(jk + \frac{1}{\rho}\right) \frac{e^{-jk\rho}}{\rho} ds, \text{ and}$$

-continued $$H_{i1} = \frac{1}{j4\pi\omega\mu}\int\int_s\left[-M\frac{1}{\rho}\left(jk+\frac{1}{\rho}\right)+(M\cdot\hat{\rho})\hat{\rho}\left(-k^2+\frac{3jk}{\rho}+\frac{3}{\rho^2}\right)+k^2M\right]$$
$$\frac{e^{-jk\rho}}{\rho}ds+\frac{1}{4\pi}\int_s J\times\hat{\rho}\left(jk+\frac{1}{\rho}\right)\frac{e^{-jk\rho}}{\rho}ds, \text{ where}$$

$$k=2\pi/\lambda_0, \omega=2\pi f, \hat{\rho}=\frac{r-r'}{|r-r'|},$$

and ρ=|r-r'|, and $\lambda_0$ represents a free-space wavelength, k represents a free-space wavenumber; ε represents the permittivity, μ represents the permeability; ω represents an angular frequency, $f$ represents an operating frequency of the antenna, ρ represents a distance from a source point to the field point on the radome, $$\hat{\rho}=\frac{r-r'}{|r-r'|}$$

represents a unit vector of ρ; r is a position vector of the field point on the radome, r' is a position vector of a source point on the antenna aperture, and i is an integer greater than 1; and an antenna far-field calculating submodule, configured to calculate the far-field information of the antenna according to the incident field information of the inner surface of the radome and the parameter information of the split facet of the radome.

In an embodiment, the far-field information calculating module further includes:

a transmission field calculating submodule, configured to calculate transmission field information of the radome according to the scattering parameter information of the radome, the electric field vector $E_{i1}$ of the incident field, and the magnetic field vector $H_{i1}$ of the incident field; wherein the transmission field information of the radome includes an electric field vector $E_{o1}$ of a primary transmission field, a magnetic field vector $H_{o1}$ of the primary transmission field, an electric field vector $E_{o2}$ of a secondary transmission field, and a magnetic field vector $H_{o2}$ of the secondary transmission field; and an antenna system far-field calculating submodule, configured to calculate the far-field information $E^t$ of the antenna system, according to the transmission field information of the radome and the parameter information of the split facet of the radome, by using the following formulas:

$$E_i^t = \frac{-jk}{4\pi}\frac{e^{-jk\rho}}{\rho}\hat{r}\times\int_s\left[(\hat{n}\times E_{o1})-\sqrt{\frac{\mu}{\varepsilon}}\hat{r}\times(\hat{n}\times H_{o1})\right]e^{-jkr'}ds,$$

$$E_r^t = \frac{-jk}{4\pi}\frac{e^{-jk\rho}}{\rho}\hat{r}\times\int_s\left[(\hat{n}\times E_{o2})-\sqrt{\frac{\mu}{\varepsilon}}\hat{r}\times(\hat{n}\times H_{o2})\right]e^{-jkr'}ds,$$

and $E^t=E_i^t+E_r^t$, where $E_i^t$ represents a far-field electric field vector of the primary transmission field, and $E_r^t$ represents a far-field electric field vector of the secondary transmission field.

In an embodiment, the transmission field calculating submodule includes:

a polarizational decomposition unit, configured to perform, according to an incident surface $\hat{n}_c\times\hat{k}_{i1}$ defined by the normal vector $\hat{n}_c$ of the split facet and a propagating direction vector $\hat{k}_{i1}$ of an incident wave and a unit vector $\hat{e}_{i1}$ of an incident electric field in a polarization direction, polarizational decomposition on a horizontal direction vector $\hat{e}_∥$ and a vertical direction vector $\hat{e}_⊥$ of the incident electromagnetic field along the incident surface, and calculate a vertical polarization wave component $E_{i1}^⊥$ and a horizontal polarization wave component $\mathbf{E}_{i1}^∥$ respectively by using the following formulas:

$$E_{i1}^⊥=(E_{i1}\cdot\hat{e}_⊥)\hat{e}_⊥, \mathbf{E}_{i1}^∥=(E_{i1}\cdot\hat{e}_∥)\hat{e}_∥, \text{ and}$$

$$H_{i1}^⊥=(H_{i1}\cdot\hat{e}_⊥)\hat{e}_⊥, \mathbf{H}_{i1}^∥=(H_{i1}\cdot\hat{e}_∥)\hat{e}_∥,$$

$$\hat{e}_⊥=\hat{e}_{i1}\cdot(\hat{n}_c\times\hat{k}_{i1}) \text{ and } \hat{e}_∥=\hat{e}_⊥\times\hat{k}_{i1}.$$

Wherein the scattering parameter information includes an amplitude $S11^⊥$ and a phase $\phi_{11}^⊥$ of a vertical polarization wave reflecting coefficient S11, an amplitude $S11^∥$ and a phase $\phi_{11}^∥$ of a horizontal polarization wave reflecting coefficient S11'; an amplitude $S21^⊥$ and a phase $\phi_{21}^⊥$ of a vertical polarization wave transmitting coefficient S21, an amplitude $S21^∥$ and a phase $\phi_{21}^∥$ of a horizontal polarization wave transmitting coefficient S21'; and a transmission field information calculating unit, configured to: calculate a vertical component $E_{o1}^⊥$ and a horizontal component $E_{o1}^∥$ of the electric field vector of the primary transmission field, a vertical component $H_{o1}^⊥$ and a horizontal component $H_{o1}^∥$ of the magnetic field vector of the primary transmission field, according to a propagation characteristic of a plane electromagnetic field and the scattering parameter information, by using the following formulas:

$$\begin{cases} E_{o1}^⊥ = E_{i1}^⊥ S21^⊥ e^{j\left(\phi_{21}^⊥-\frac{2\pi d}{\lambda}\cos\theta_{i1}\right)}, E_{o1}^∥ = E_{i1}^∥ S21^∥ e^{j\left(\phi_{21}^∥-\frac{2\pi d}{\lambda}\cos\theta_{i1}\right)} \\ H_{o1}^⊥ = H_{i1}^⊥ S21^∥ e^{j\left(\phi_{21}^∥-\frac{2\pi d}{\lambda}\cos\theta_{i1}\right)}, H_{o1}^∥ = H_{i1}^∥ S21^⊥ e^{j\left(\phi_{21}^⊥-\frac{2\pi d}{\lambda}\cos\theta_{i1}\right)} \end{cases};$$

wherein the incident field information includes an incident angle $\theta_{i1}$;

obtain the electric field vector $E_{o1}$ of the primary transmission field according to the vertical component $E_{o1}^⊥$ and the horizontal component $E_{o1}^∥$ of the electric field vector of the primary transmission field, and obtain the magnetic field vector $H_{o1}$ of the primary transmission field according to the vertical component $H_{o1}^⊥$ and the horizontal component $H_{o1}^∥$ of the magnetic field vector of the primary transmission field;

calculate an electric field vector $E^r$ and a magnetic field vector $H^r$ of the primary reflection field by using the following formulas:

$$\begin{cases} E^r = E_{i1}^⊥ S11^⊥ e^{j\phi_{11}^⊥} + \left(E_{o1}^∥ \times \hat{k}_r\right) S11^∥ e^{j\phi_{11}^∥} \\ H^r = H_{i1}^⊥ S11^∥ e^{j\phi_{11}^∥} + \left(H_{i1}^∥ \times \hat{k}_r\right) S11^⊥ e^{j\phi_{11}^⊥} \end{cases},$$

$\hat{k}_r=\hat{k}_{i1}-2(\hat{n}_c\cdot\hat{\mathbf{k}}_{i1})\hat{n}_c$; wherein $\hat{k}_r$ represents a reflection direction vector of an incident wave; and calculate an electric field vector $E_{i2}$ and a magnetic field vector $H_{i2}$ of the secondary incident field by using the following formulas:

$$E_{i2} = \frac{1}{j4\pi\omega\varepsilon}\int_s\left[-(\hat{n}\times H^r)\frac{1}{\rho}\left(jk+\frac{1}{\rho}\right)+[(\hat{n}\times H^r)\Box\hat{\rho}]\hat{\rho}\left(-k^2+\frac{3jk}{\rho}+\frac{3}{\rho^2}\right)+\right.$$

$$\left. k^2(\hat{n}\times H^r)\right]\frac{e^{-jk\rho}}{\rho}ds' - \frac{1}{4\pi}\int_s(E^r\times\hat{n})\times\hat{\rho}\left(jk+\frac{1}{\rho}\right)\frac{e^{-jk\rho}}{\rho}ds', \text{ and}$$

$$H_{i2} = \frac{1}{j4\pi\omega\mu}\int_s\left[-(E^r\times\hat{n})\frac{1}{\rho}\left(jk+\frac{1}{\rho}\right)+[(E^r\times\hat{n})\Box\hat{\rho}]\hat{\rho}\left(-k^2+\frac{3jk}{\rho}+\frac{3}{\rho^2}\right)+\right.$$

$$\left. k^2(E^r\times\hat{n})\right]\frac{e^{-jk\rho}}{\rho}ds' + \frac{1}{4\pi}\int_s(\hat{n}\times H^r)\times\hat{\rho}\left(jk+\frac{1}{\rho}\right)\frac{e^{-jk\rho}}{\rho}ds'$$

In an embodiment, the preprocessing submodule includes a simplification processing unit, a translation processing unit, and a rotation processing unit. The simplification processing unit, the translation processing unit, and the rotation processing unit are respectively configured to perform simplification processing, translation processing, and rotation processing on the model data information of the radome.

In an embodiment, the second obtaining module includes: a splitting and extracting submodule, configured to split preprocessed data information of the radome, and extract the parameter information of the split facet of the radome from the preprocessed data information of the radome after splitting.

In an embodiment, the electrical performance parameter information of the radome includes at least one of the following: power transmission efficiency, a side lobe elevation parameter, a side lobe elevation parameter of a far-zone RMS, 3 dB beamwidth, and consistency of amplitude and phase.

In summary, according to the above technical solutions of the present invention, full-wave simulation is performed on a single periodic stacked layer combined with periodic boundaries, so as to obtain scattering parameters of the plane waves that are respectively parallel and perpendicular to the incident surface at different frequency points and different incident angles. This implements evaluating electrical performance of the radome having microstructural stacked layers and the dielectric radome, an application range of the algorithm is greatly extended, calculation accuracy and calculation rate of electric performance evaluation are greatly improved.

The above descriptions are merely preferred embodiments of the present invention and are not intended to limit the present invention. Any modification, equivalent replacement, and improvement made within the spirit and principle of the present invention shall fall within the protection scope of the present invention.

What is claimed is:

1. A method for evaluating electrical performance of a radome, the radome and an antenna disposed in the radome forming an antenna system, and the method for evaluating electrical performance comprising:
   obtaining electromagnetic parameter information of the antenna and parameter information of the radome;
   calculating far-field information of the antenna and far-field information of the antenna system according to the electromagnetic parameter information of the antenna and the parameter information of the radome; and
   calculating electrical performance parameter information of the radome according to the far-field information of the antenna and the far-field information of the antenna system, wherein the radome is a metamaterial radome that has microstructure stacks;

wherein the method for evaluating electrical performance specifically comprises:
   obtaining near-field electric field information of the antenna according to the measurement, and calculating electric field information of antenna aperture surface according to the near-field electric field information;
   obtaining model data information of the radome, and obtaining split facet information of the radome according to the model data information of the radome;
   calculating the far-field information of the antenna and the far-field information of the antenna system based on the electric field information of the antenna aperture surface and the split facet information of the radome; and
   calculating the electrical performance parameter information of the radome based on the far-field information of the antenna and the far-field information of the antenna system;

wherein the step of obtaining split facet information of the radome according to the model data information of the radome comprises:
   performing digital model preprocessing on the model data information of the radome, to obtain simplified model data information of the radome; the simplified model data information of the radome determining a center of the antenna aperture surface as an origin of a plane coordinate system, and the antenna aperture surface and the plane coordinate system being located on the same plane; and
   performing discrete splitting and extracting on the simplified model data information of the radome, to obtain the split facet information of the radome;

wherein the split facet information of the radome comprises a center point coordinate (x, y, z) of the split facet, a normal vector $\hat{n}_c$ of the split facet, and an area ds of the split facet; and the step of calculating the far-field information of the antenna based on the electric field information of the antenna aperture surface and the split facet information of the radome comprises:
   calculating incident field information radiated by the antenna to the radome based on the electric field information of the antenna aperture surface and the split facet information of the radome, the incident field information of an inner surface of the radome comprising an electric field vector $E_{i1}$ and a magnetic field vector $H_{i1}$ of an incident field at a field point that is located on the $i^{th}$ split facet, and performing calculation operation according to the following formulas:

$$E_{i1} = -\frac{1}{4\pi}\int_s(E_a\times\hat{n}_a)\times\hat{\rho}\left(jk+\frac{1}{\rho}\right)\frac{e^{-jk\rho}}{\rho}ds; \text{ and}$$

$$H_{i1} = \frac{1}{j4\pi\omega\varepsilon}\int_s\left[-(E_a\times\hat{n}_a)\frac{1}{\rho}\left(jk+\frac{1}{\rho}\right)+k^2(E_a\times\hat{n}_a)\right]\frac{e^{-jk\rho}}{\rho}ds' +$$

$$\frac{1}{j4\pi\omega\mu}\int_s[(E_a\times\hat{n}_a)\Box\hat{\rho}]\hat{\rho}\left(-k^2+\frac{3jk}{\rho}+\frac{3}{\rho^2}\right)\frac{e^{-jk\rho}}{\rho}ds';$$

wherein $\lambda_0$ represents a free-space wavelength, $k=2\pi/\lambda_0$ represents a free-space wavenumber; $\varepsilon$ represents the permittivity, $\mu$ represents the permeability; $\omega 2\pi f$ represents an angular frequency, $f$ represents an operating frequency of the antenna; $\rho=|r-r'|$ represents a distance from a source point to the field point on the radome, $$\hat{\rho} = \frac{r - r'}{|r - r'|}$$

represents a unit vector of ρ; r is a position vector of the field point on the radome, r' is a position vector of the source point on the antenna aperture; $\hat{n}_a$ is a unit normal vector of the antenna aperture, the electric field information of the antenna aperture surface comprises an electric field Ea excited by the antenna aperture, and i is an integer greater than 1;

or, wherein the method for evaluating electrical performance specifically comprises:

obtaining parameter information of an electric field and a magnetic field on the antenna aperture surface or electric and magnetic current density vectors of the antenna surface, and obtaining scattering parameter information of the radome;

obtaining parameter information of a split facet of the radome;

calculating the far-field information of the antenna and the far-field information of the antenna system respectively based on the parameter information of the electric field and the magnetic field on the antenna aperture surface or the electric and magnetic current density vectors of the antenna surface, the scattering parameter information of the radome, and the parameter information of the split facet of the radome; and calculating the electrical performance parameter information of the radome based on the far-field information of the antenna and the far-field information of the antenna system;

wherein the parameter information of the split facet of the radome comprises a center point coordinate (x, y, z) of the split facet, a normal vector $\hat{n}_c$ of the split facet, and an area ds of the split facet; and the step of calculating the far-field information of the antenna based on the electric and magnetic current density vectors of the antenna surface, the scattering parameter information of the radome, and the parameter information of the split facet of the radome comprises:

calculating incident field information of an inner surface of the radome based on the electric current density vector J and the magnetic current density vector M of the antenna surface and the parameter information of the split facet of the radome, the incident field information of the inner surface of the radome comprising an electric field vector $E_{i1}$ and a magnetic field vector $H_{i1}$ of the incident field at a field point that is located on the $i^{th}$ split facet of the radome, and performing calculation operation according to the following formulas:

$$E_{i1} = \frac{1}{j4\pi\omega\varepsilon}\iint_s \left[-J\frac{1}{\rho}\left(jk + \frac{1}{\rho}\right) + (J\Box\hat{\rho})\hat{\rho}\left(-k^2 + \frac{3jk}{\rho} + \frac{3}{\rho^2}\right) + k^2 J\right]\frac{e^{-jk\rho}}{\rho}ds - \frac{1}{4\pi}\int_s M \times \hat{\rho}\left(jk + \frac{1}{\rho}\right)\frac{e^{-jk\rho}}{\rho}ds, \text{ and}$$

$$H_{i1} = \frac{1}{j4\pi\omega\mu}\iint_s \left[-M\frac{1}{\rho}\left(jk + \frac{1}{\rho}\right) + (M\Box\hat{\rho})\hat{\rho}\left(-k^2 + \frac{3jk}{\rho} + \frac{3}{\rho^2}\right) + k^2 M\right]$$

$$\frac{e^{-jk\rho}}{\rho}ds + \frac{1}{4\pi}\int_s J \times \hat{\rho}\left(jk + \frac{1}{\rho}\right)\frac{e^{-jk\rho}}{\rho}ds;$$

$$k = 2\pi/\lambda_0, \omega = 2\pi f, \hat{\rho} = \frac{r - r'}{|r - r'|}, \rho = |r - r'|;$$

and wherein $\lambda_0$ represents a free-space wavelength, k represents a free-space wavenumber; ε represents the permittivity, μ represents the permeability; ω represents an angular frequency, ƒ represents an operating frequency of the antenna, ρ represents a distance from a source point to the field point on the radome, $$\hat{\rho} = \frac{r - r'}{|r - r'|}$$

represents a unit vector of ρ; r is a position vector of the field point on the radome, r' is a position vector of the source point on the antenna aperture;

and i is an integer greater than 1.

2. The method for evaluating electrical performance of a radome according to claim 1, after the step of obtaining near-field electric field information of the antenna according to the measurement, and calculating electric field information of antenna aperture surface according to the near-field electric field information, the method further comprising:

performing near-field to far-field transformation on the electric field information of the antenna aperture surface, to obtain a calculated value of the far-field information corresponding to the electric field information of the antenna aperture surface; and comparing a measured value of the far-field information of the antenna aperture surface obtained according to the actual measurement and the calculated value of the far-field information of the antenna aperture surface, to verify the electric field information of the antenna aperture surface.

3. The method for evaluating electrical performance of a radome according to claim 2, wherein the step of comparing a measured value of the far-field information of the antenna aperture surface obtained according to the actual measurement and the calculated value of the far-field information of the antenna aperture surface, to verify the electric field information of the antenna aperture surface comprises:

comparing the calculated value of the far-field information of the antenna aperture surface and the measured value of the far-field information of the antenna aperture surface; and determining the electric field information of the antenna aperture surface as the actual electric field information of the antenna aperture surface, if a difference between the calculated value of the far-field information and the measured value of the far-field information does not exceed a predetermined threshold; or adjusting a test parameter of the near-field electric field information of the antenna and returning to the step of obtaining near-field electric field information of the antenna according to the measurement and calculating electric field information of antenna aperture surface according to the near-field electric field information, if the difference exceeds the predetermined threshold.

4. The method for evaluating electrical performance of a radome according to claim 1, wherein the step of calculating the far-field information of the antenna based on the electric field information of the antenna aperture surface and the split facet information of the radome further comprises:
  obtaining scattering parameter information of the radome;
  calculating transmission field information of the radome based on the scattering parameter information of the radome and the incident field information radiated by the antenna to the radome, the transmission field information comprising an electric field vector $E_{o1}$ and a magnetic field vector $H_{o1}$ of a primary transmission field, an electric field vector $E_{o2}$ and a magnetic field vector $H_{o2}$ of a secondary transmission field; and
  calculating the far-field information $E^t$ $(\theta,\phi)$ of the antenna system, based on the transmission field information of the radome and the split facet information of the radome, by using the following formulas:

$$E_i^t(\theta, \phi) = \frac{-jk}{4\pi} \frac{e^{-jkr}}{\rho} \hat{r} \times \int_s \left[ (\hat{n} \times E_{o1}) - \sqrt{\frac{\mu}{\varepsilon}} \hat{r} \times (\hat{n} \times H_{o1}(r)) \right] e^{-jkr'} ds;$$

$$E_r^t(\theta, \phi) = \frac{-jk}{4\pi} \frac{e^{-jk\rho}}{\rho} \hat{r} \times \int_s \left[ (\hat{n} \times E_{o2}) - \sqrt{\frac{\mu}{\varepsilon}} \hat{r} \times (\hat{n} \times H_{o2}(r)) \right] e^{-jkr'} ds;$$

and $$E^t(\theta, \phi) = E_i^t(\theta, \phi) + E_r^t(\theta, \phi).$$

5. The method for evaluating electrical performance of a radome according to claim 4, wherein the step of obtaining scattering parameter information of the radome comprises:
  performing full-wave simulation on the radome to obtain the scattering parameter information of the radome.

6. The method for evaluating electrical performance of a radome according to claim 1, wherein the step of obtaining scattering parameter information of the radome comprises:
  generating a radome simulation model based on the radome, each of the radome and the radome simulation model comprising a plurality of microstructure stacks that have the same structure and are arranged in the same manner; and
  performing full-wave simulation on the radome simulation model to obtain the scattering parameter information of the radome.

7. The method for evaluating electrical performance of a radome according to claim 1, wherein the step of obtaining parameter information of an electric field and a magnetic field on the antenna aperture surface or electric and magnetic current density vectors of the antenna surface, and obtaining scattering parameter information of the radome comprises:
  obtaining model data information of the antenna and model data information of the radome;
  performing digital model preprocessing on the model data information of the antenna and the model data information of the radome, to obtain preprocessed data information of the antenna and preprocessed data information of the radome; the preprocessed data information of the antenna and the preprocessed data information of the radome determining a center of the antenna aperture surface as an origin of a coordinate system, and the antenna aperture surface and the coordinate system being located on the same plane;
  obtaining the parameter information of the electric field and the magnetic field on the antenna aperture surface or the electric and magnetic current density vectors of the antenna surface based on the preprocessed data information of the antenna; and
  obtaining the scattering parameter information of the radome based on the preprocessed data information of the radome.

8. The method for evaluating electrical performance of a radome according to claim 1, wherein the step of calculating the far-field information of the antenna based on the electric and magnetic current density vectors of the antenna surface, the scattering parameter information of the radome, and the parameter information of the split facet of the radome further comprises:
  calculating transmission field information of the radome based on the scattering parameter information of the radome, the electric field vector $E_{i1}$ and the magnetic field vector $H_{i1}$ of the incident field; the transmission field information of the radome comprising an electric field vector $E^{o1}$ and a magnetic field vector $H_{o1}$ of a primary transmission field, an electric field vector $E_{o2}$ and a magnetic field vector $H_{o2}$ of a secondary transmission field; and
  calculating the far-field information $E^t$ of the antenna system, based on the transmission field information of the radome and the parameter information of the split facet of the radome, by using the following formulas:

$$E_i^t = \frac{-jk}{4\pi} \frac{e^{-jk\rho}}{\rho} \hat{r} \times \int_s \left[ (\hat{n} \times E_{o1}) - \sqrt{\frac{\mu}{\varepsilon}} \hat{r} \times (\hat{n} \times H_{o1}) \right] e^{-jkr'} ds;$$

$$E_r^t = \frac{-jk}{4\pi} \frac{e^{-jk\rho}}{\rho} \hat{r} \times \int_s \left[ (\hat{n} \times E_{o2}) - \sqrt{\frac{\mu}{\varepsilon}} \hat{r} \times (\hat{n} \times H_{o2}) \right] e^{-jkr'} ds; \text{ and}$$

$$E^t = E_i^t + E_r^t;$$

wherein $E_i^t$ represents a far-field electric field vector of the primary transmission field, and $E_r^t$ represents a far-field electric field vector of the secondary transmission field.

9. The method for evaluating electrical performance of a radome according to claim 8, wherein the step of obtaining parameter information of the split facet of the radome comprises:
  splitting preprocessed data information of the radome, and extracting the parameter information of the split facet of the radome from the preprocessed data information of the radome after splitting.

10. A device for evaluating electrical performance of a radome, wherein the radome and an antenna disposed in the radome form an antenna system, and the device for evaluating electrical performance comprises:
  an obtaining module, configured to obtain electromagnetic parameter information of the antenna and parameter information of the radome;
  a calculation module, configured to calculate far-field information of the antenna and far-field information of the antenna system according to the electromagnetic parameter information of the antenna and the parameter information of the radome; and
  an electrical performance parameter calculating module, configured to calculate electrical performance parameter information of the radome according to the far-field information of the antenna and the far-field information of the antenna system, wherein the radome is a metamaterial radome that has microstructure stacks;
wherein the device for evaluating electrical performance specifically comprises:
  an electric field information obtaining module, configured to obtain near-field electric field information of the antenna according to the measurement, and calculate electric field information of the antenna aperture surface according to the near-field electric field information;

a facet information obtaining module, configured to obtain model data information of the radome, and obtain the split facet information of the radome according to the model data information of the radome;

a far-field information calculating module, connected to the electric field information obtaining module and the facet information obtaining module, and configured to calculate the far-field information of the antenna and the far-field information of the antenna system according to the electric field information of the antenna aperture surface and the split facet information of the radome; and the electrical performance parameter calculating module, connected to the far-field information calculating module, and configured to calculate the electrical performance parameter information of the radome according to the far-field information of the antenna and the far-field information of the antenna system;

wherein the facet information obtaining module comprises:

a preprocessing submodule, configured to perform digital model preprocessing on the model data information of the radome, to obtain simplified model data information of the radome; wherein the simplified model data information of the radome determines a center of the antenna aperture surface as an origin of a plane coordinate system, and the antenna aperture surface and the plane coordinate system are located on the same plane; and a split facet information extracting submodule, configured to perform discrete splitting and extracting operations on the simplified model data information of the radome, to obtain the split facet information of the radome;

wherein the split facet information of the radome comprises a center point coordinate (x, y, z) of a split facet, a normal vector $\hat{n}_c$ of the split facet, and an area ds of the split facet; and the far-field information calculating module comprises:

an incident field calculating submodule, configured to calculate incident field information radiated by the antenna to the radome according to the electric field information of the antenna aperture surface and the split facet information of the radome, wherein the incident field information of an inner surface of the radome comprises an electric field vector $E_{i1}$ and a magnetic field vector $H_{i1}$ of an incident field at a field point that is located on the $i^{th}$ split facet, and perform calculation operation according to the following formulas:

$$E_{i1} = -\frac{1}{4\pi}\int_s (E_a \times \hat{n}_a) \times \hat{\rho}\left(jk + \frac{1}{\rho}\right)\frac{e^{-jk\rho}}{\rho}ds,$$

$$H_{i1} = \frac{1}{j4\pi\omega\mu}\int_s\left[-(E_a \times \hat{n}_a)\frac{1}{\rho}\left(jk + \frac{1}{\rho}\right) + k^2(E_a \times \hat{n}_a)\right]\frac{e^{-jk\rho}}{\rho}ds' +$$

$$\frac{1}{j4\pi\omega\mu}\int_s [(E_a \times \hat{n}_a)\square\hat{\rho}]\hat{\rho}\left(-k^2 + \frac{3jk}{\rho} + \frac{3}{\rho^2}\right)\frac{e^{-jk\rho}}{\rho}ds';$$

wherein $\lambda_0$ represents a free-space wavelength, $k=2\pi/\lambda_0$ represents a free-space wave-number, $\varepsilon$ represents the permittivity, $\mu$ represents the permeability; $\omega=2\pi f$ represents an angular frequency, $f$ represents an operating frequency of the antenna, $\rho=|r-r'|$ represents a distance from a source point to the field point on the radome, $$\hat{\rho} = \frac{r - r'}{|r - r'|}$$

represents a unit vector of $\rho$; r is a position vector of the field point on the radome, r' is a position vector of the source point on the antenna aperture; $\hat{n}_a$ is a unit normal vector of the antenna aperture, the electric field information of the antenna aperture surface comprises an electric field $E_a$ excited by the antenna aperture, and i is an integer greater than 1;

or, wherein the device for evaluating electrical performance specifically comprises:

a first obtaining module, configured to obtain parameter information of an electric field and a magnetic field on the antenna aperture surface or electric and magnetic current density vectors of an antenna surface, and obtain scattering parameter information of the radome;

a second obtaining module, configured to obtain parameter information of a split facet of the radome;

a far-field information calculating module, configured to calculate the far-field information of the antenna and the far-field information of the antenna system respectively based on the parameter information of the electric field and the magnetic field on the antenna aperture surface or the electric and magnetic current density vectors of the antenna surface, the scattering parameter information of the radome, and the parameter information of the split facet of the radome; and the electrical performance parameter calculating module, configured to calculate the electrical performance parameter information of the radome based on the far-field information of the antenna and the far-field information of the antenna system;

wherein the first obtaining module comprises:

a simulation submodule, configured to generate a radome simulation model based on the radome, wherein each of the radome and the radome simulation model comprises a plurality of microstructure stacks that have the same structure and are arranged in the same manner;

the simulation submodule further configured to perform full-wave simulation on the radome simulation model to obtain the scattering parameter information of the radome;

wherein the split facet information of the radome comprises a center point coordinate (x, y, z) of the split facet, a normal vector $\hat{n}_c$ of the split facet, and an area ds of the split facet;

the far-field information calculating module comprises:

an incident field calculating submodule, configured to calculate incident field information of an inner surface of the radome based on the electric current density vector J and the magnetic current density vector M of the antenna surface and the parameter information of the split facet of the radome, the incident field information of the inner surface of the radome comprising an electric field vector $E_{i1}$ and a magnetic field vector $H_{i1}$ of the incident field at a field point that is located on the $i^{th}$ split facet of the radome, and performing calculation operation according to the following formulas:

$$E_{i1} = \frac{1}{j4\pi\omega\varepsilon}\iint_s\left[-J\frac{1}{\rho}\left(jk+\frac{1}{\rho}\right)+(J\square\hat{\rho})\hat{\rho}\left(-k^2+\frac{3jk}{\rho}+\frac{3}{\rho^2}\right)+k^2 J\right]\frac{e^{-jk\rho}}{\rho}ds -$$

$$\frac{1}{4\pi}\int_s M\times\hat{\rho}\left(jk+\frac{1}{\rho}\right)\frac{e^{-jk\rho}}{\rho}ds;$$

$$H_{i1} = \frac{1}{j4\pi\omega\mu}\iint_s\left[-M\frac{1}{\rho}\left(jk+\frac{1}{\rho}\right)+(M\square\hat{\rho})\hat{\rho}\left(-k^2+\frac{3jk}{\rho}+\frac{3}{\rho^2}\right)+k^2 M\right]$$

$$\frac{e^{-jk\rho}}{\rho}ds + \frac{1}{4\pi}\int_s J\times\hat{\rho}\left(jk+\frac{1}{\rho}\right)\frac{e^{-jk\rho}}{\rho}ds;$$

$$k = 2\pi/\lambda_0,\ \omega = 2\pi f,\ \hat{\rho}=\frac{r-r'}{|r-r'|},\text{ and } \rho = |r-r'|;$$

wherein $\lambda_0$ represents a free-space wavelength, k represents a free-space wavenumber; $\varepsilon$ represents the permittivity, $\mu$ represents the permeability; $\omega$ represents an angular frequency, $f$ represents an operating frequency of the antenna, $\rho$ represents a distance from a source point to the field point on the radome, $$\hat{\rho}=\frac{r-r'}{|r-r'|}$$

represents a unit vector of $\rho$; r is a position vector of the field point on the radome, r' is a position vector of the source point on the antenna aperture; and i is an integer greater than 1; and an antenna far-field calculating submodule, configured to calculate the far-field information of the antenna according to the incident field information of the inner surface of the radome and the parameter information of the split facet of the radome.

11. An antenna system, comprising a radome and an antenna disposed in the radome, wherein the antenna system is configured for:

obtaining electromagnetic parameter information of the antenna and parameter information of the radome;

calculating far-field information of the antenna and far-field information of the antenna system according to the electromagnetic parameter information of the antenna and the parameter information of the radome; and calculating electrical performance parameter information of the radome according to the far-field information of the antenna and the far-field information of the antenna system, wherein the radome is a metamaterial radome that has microstructure stacks;

wherein the antenna system is specifically configured for:

obtaining near-field electric field information of the antenna according to the measurement, and calculating electric field information of antenna aperture surface according to the near-field electric field information;

obtaining model data information of the radome, and obtaining split facet information of the radome according to the model data information of the radome;

calculating the far-field information of the antenna and the far-field information of the antenna system according to the electric field information of the antenna aperture surface and the split facet information of the radome; and calculating the electrical performance parameter information of the radome according to the far-field information of the antenna and the far-field information of the antenna system;

wherein the step of obtaining split facet information of the radome according to the model data information of the radome comprises:

performing digital model preprocessing on the model data information of the radome, to obtain simplified model data information of the radome; the simplified model data information of the radome determining a center of the antenna aperture surface as an origin of a plane coordinate system, and the antenna aperture surface and the plane coordinate system being located on the same plane; and performing discrete splitting and extracting on the simplified model data information of the radome, to obtain the split facet information of the radome;

wherein the split facet information of the radome comprises a center point coordinate (x, y, z) of the split facet, a normal vector $\hat{n}_c$ of the split facet, and an area ds of the split facet; and the step of calculating the far-field information of the antenna based on the electric field information of the antenna aperture surface and the split facet information of the radome comprises:

calculating incident field information radiated by the antenna to the radome based on the electric field information of the antenna aperture surface and the split facet information of the radome, the incident field information of an inner surface of the radome comprising an electric field vector $E_{i1}$ and a magnetic field vector $H_{i1}$ of an incident field at a field point that is located on the $i^{th}$ split facet, and performing calculation operation according to the following formulas:

$$E_{i1} = -\frac{1}{4\pi}\int_s(E_a\times\hat{n}_a)\times\hat{\rho}\left(jk+\frac{1}{\rho}\right)\frac{e^{-jk\rho}}{\rho}ds;\text{ and}$$

$$H_{i1} = \frac{1}{j4\pi\omega\mu}\iint_s\left[-(E_a\times\hat{n}_a)\frac{1}{\rho}\left(jk+\frac{1}{\rho}\right)+k^2(E_a\times\hat{n}_a)\right]\frac{e^{-jk\rho}}{\rho}ds' +$$

$$\frac{1}{j4\pi\omega\mu}\int_s[(E_a\times\hat{n}_a)\square\hat{\rho}]\hat{\rho}\left(-k^2+\frac{3jk}{\rho}+\frac{3}{\rho^2}\right)\frac{e^{-jk\rho}}{\rho}ds';$$

wherein $\lambda_0$ represents a free-space wavelength, $k=2\pi/\lambda_0$ represents a free-space wavenumber; $\varepsilon$ represents the permittivity, $\mu$ represents the permeability; $\omega=2\pi f$ represents an angular frequency, $f$ represents an operating frequency of the antenna; $\rho=|r-r'|$ represents a distance from a source point to the field point on the radome, $$\hat{\rho}=\frac{r-r'}{|r-r'|}$$

represents a unit vector of $\rho$; r is a position vector of the field point on the radome, r' is a position vector of the source point on the antenna aperture; $\hat{n}_a$ is a unit normal vector of the antenna aperture, the electric field information of the antenna aperture surface comprises an electric field Ea excited by the antenna aperture, and i is an integer greater than 1;

or, wherein the antenna system is specifically configured for:

obtaining parameter information of an electric field and a magnetic field on the antenna aperture surface or electric and magnetic current density vectors of the antenna surface, and obtaining scattering parameter information of the radome;

obtaining parameter information of a split facet of the radome;

calculating the far-field information of the antenna and the far-field information of the antenna system respectively based on the parameter information of the electric field and the magnetic field on the antenna aperture surface or the electric and magnetic current density vectors of the antenna surface, the scattering parameter information of the radome, and the parameter information of the split facet of the radome; and calculating the electrical performance parameter information of the radome based on the far-field information of the antenna and the far-field information of the antenna system;

wherein the parameter information of the split facet of the radome comprises a center point coordinate (x, y, z) of the split facet, a normal vector $\hat{n}_c$ of the split facet, and an area ds of the split facet; and the step of calculating the far-field information of the antenna based on the electric and magnetic current density vectors of the antenna surface, the scattering parameter information of the radome, and the parameter information of the split facet of the radome comprises:

calculating incident field information of an inner surface of the radome based on the electric current density vector J and the magnetic current density vector M of the antenna surface and the parameter information of the split facet of the radome, the incident field information of the inner surface of the radome comprising an electric field vector $E_{i1}$ and a magnetic field vector $H_{i1}$ of the incident field at a field point that is located on the $i^{th}$ split facet of the radome, and performing calculation operation according to the following formulas:

$$E_{i1} = \frac{1}{j4\pi\omega\varepsilon}\int\int_s \left[-J\frac{1}{\rho}\left(jk+\frac{1}{\rho}\right) + (J\square\hat{\rho})\hat{\rho}\left(-k^2+\frac{3jk}{\rho}+\frac{3}{\rho^2}\right) + k^2 J\right]\frac{e^{-jk\rho}}{\rho}ds - \frac{1}{4\pi}\int_s M\times\hat{\rho}\left(jk+\frac{1}{\rho}\right)\frac{e^{-jk\rho}}{\rho}ds, \text{ and}$$

$$H_{i1} = \frac{1}{j4\pi\omega\mu}\int\int_s \left[-M\frac{1}{\rho}\left(jk+\frac{1}{\rho}\right) + (M\square\hat{\rho})\hat{\rho}\left(-k^2+\frac{3jk}{\rho}+\frac{3}{\rho^2}\right) + k^2 M\right]\frac{e^{-jk\rho}}{\rho}ds + \frac{1}{4\pi}\int_s J\times\hat{\rho}\left(jk+\frac{1}{\rho}\right)\frac{e^{-jk\rho}}{\rho}ds;$$

$$k = 2\pi/\lambda_0, \omega = 2\pi f, \hat{\rho} = \frac{r-r'}{|r-r'|}, \text{ and } \rho = |r-r'|;$$

and wherein $\lambda_0$ represents a free-space wavelength, k represents a free-space wavenumber; $\varepsilon$ represents the permittivity; $\mu$ represents the permeability; $\omega$ represents an angular frequency, $f$ represents an operating frequency of the antenna, $\rho$ represents a distance from a source point to the field point on the radome, $$\hat{\rho} = \frac{r-r'}{|r-r'|}$$

represents a unit vector of $\rho$; r is a position vector of the field point on the radome, r' is a position vector of the source point on the antenna aperture; and i is an integer greater than 1.

* * * * *